United States Patent
Sugaya

(10) Patent No.: US 11,995,360 B2
(45) Date of Patent: May 28, 2024

(54) CONTROL METHOD, IMAGE PROCESSING APPARATUS, TERMINAL DEVICE, AND PROGRAM

(71) Applicant: Konica Minolta, Inc., Tokyo (JP)

(72) Inventor: Takashi Sugaya, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/143,951

(22) Filed: May 5, 2023

(65) Prior Publication Data

US 2023/0401012 A1 Dec. 14, 2023

(30) Foreign Application Priority Data

Jun. 13, 2022 (JP) ................................. 2022-095213

(51) Int. Cl.
G06F 3/12 (2006.01)

(52) U.S. Cl.
CPC .......... G06F 3/1204 (2013.01); G06F 3/1207 (2013.01); G06F 3/1236 (2013.01); G06F 3/1285 (2013.01)

(58) Field of Classification Search
None
See application file for complete search history.

(56) References Cited

U.S. PATENT DOCUMENTS

| | | | | |
|---|---|---|---|---|
| 2007/0146778 A1* | 6/2007 | Kitagata | ............... | G06F 3/1204 358/1.15 |
| 2014/0355058 A1 | 12/2014 | Matsuhara et al. | | |
| 2015/0324159 A1* | 11/2015 | Sugaya | ................... | H04L 67/02 358/1.15 |
| 2017/0339735 A1* | 11/2017 | Kawaguchi | ........... | H04W 76/14 |
| 2018/0316553 A1* | 11/2018 | Okazawa | ............ | H04L 41/0806 |
| 2021/0342216 A1 | 11/2021 | Dines | | |
| 2022/0057971 A1* | 2/2022 | Suzuki | .................. | G06F 3/1236 |
| 2022/0075697 A1* | 3/2022 | Sugiura | .................. | B60K 35/00 |
| 2022/0317835 A1* | 10/2022 | Okuno | ..................... | G06F 21/84 |

(Continued)

FOREIGN PATENT DOCUMENTS

JP 2016-144097 A 8/2016

OTHER PUBLICATIONS

Partial European Search Report (PESR) dated Oct. 17, 2023 for European Patent Application No. 23176651.0.

(Continued)

*Primary Examiner* — Helen Zong

(74) *Attorney, Agent, or Firm* — RANKIN, HILL & CLARK LLP

(57) ABSTRACT

A control method for an image processing apparatus having a remote control mode in which a control instruction is received from a terminal device, includes: causing the image processing apparatus to transition to the remote control mode; receiving, by the terminal device, an operation by RPA and giving a control instruction to the image processing apparatus, wherein the image processing apparatus cancels the remote control mode when a period during which there is no communication with the terminal device reaches a certain period of time, and in the receiving, the terminal device repeats communication with the image processing apparatus at a cycle shorter than the certain period of time after giving the control instruction to the image processing apparatus.

16 Claims, 25 Drawing Sheets

(56) References Cited

U.S. PATENT DOCUMENTS

2023/0053390 A1* 2/2023 Sakaguchi ............ G06F 3/1454

OTHER PUBLICATIONS

Bartmao, "pyRPA", 2019, XP093089715, www.github.com, Retrieved from the Internet: URL: https://github.com/bartmao/pyRPA, 4 pages; Cited in PESR.
Extended European Search Report (EESR) dated Jan. 23, 2024 for Europaen Patent Application No. 23176651.0.

* cited by examiner

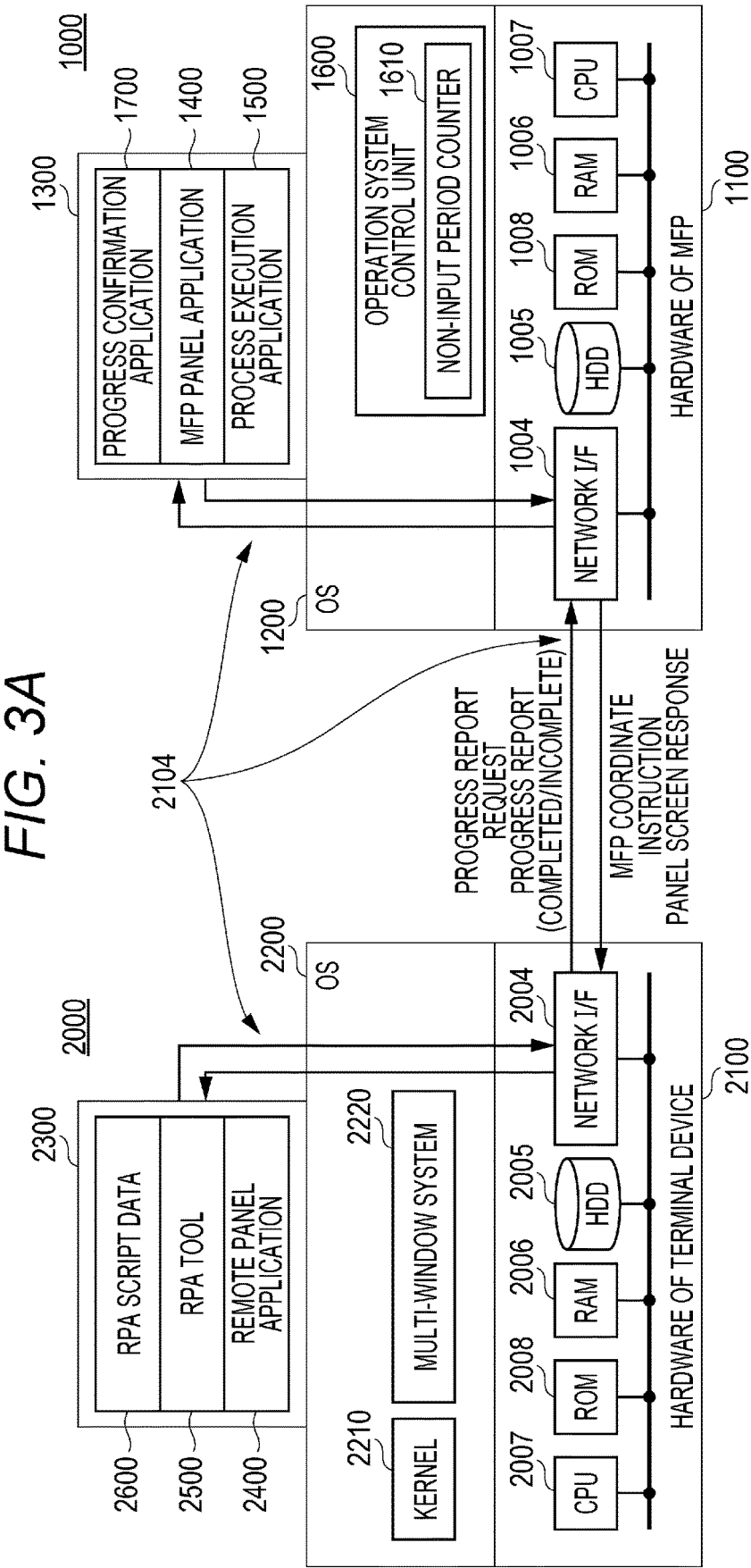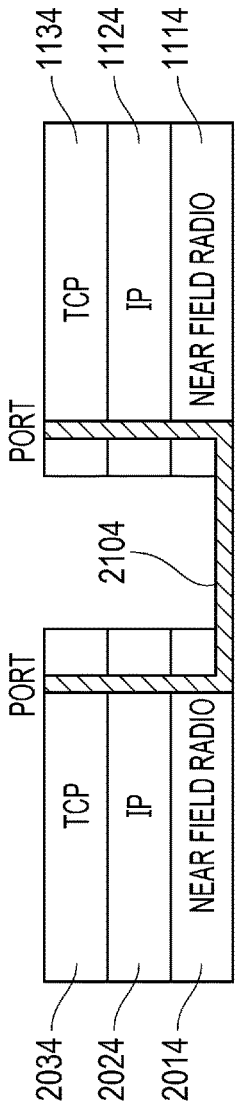

*FIG. 5*

| |
|---|
| PROCEDURE 1. GENERATE CLICK EVENT AT COORDINATES ($x_1$, $y_1$) OF "DIRECT INPUT" ON DESKTOP SCREEN |
| PROCEDURE 2. GENERATE EVENT FOR INPUTTING CHARACTER STRING 03-XXX-XXXX |
| PROCEDURE 3. GENERATE CLICK EVENT AT COORDINATES ($x_2$, $y_2$) OF IMAGE "DOCUMENT IMAGE QUALITY  CHARACTERS" ON DESKTOP SCREEN |
| PROCEDURE 4. GENERATE CLICK EVENT AT COORDINATES ($x_3$, $y_3$) OF IMAGE "CHARACTER/PICTURE" ON DESKTOP SCREEN |
| -------- READING DOCUMENT AND PRESSING START BUTTON BY USER -------- |
| PROCEDURE 5. DISPLAY RPA MENU "IS FAX TRANSMISSION COMPLETED?" |
| PROCEDURE 6. Wait DESIGNATION  ACQUIRE SCREENSHOT OF SCREEN OF TRANSMISSION REPORT |
| PROCEDURE 7. TRANSMIT IMAGE FILE OF SCREENSHOT TO ADDRESS aaa@bbb.co.jp |

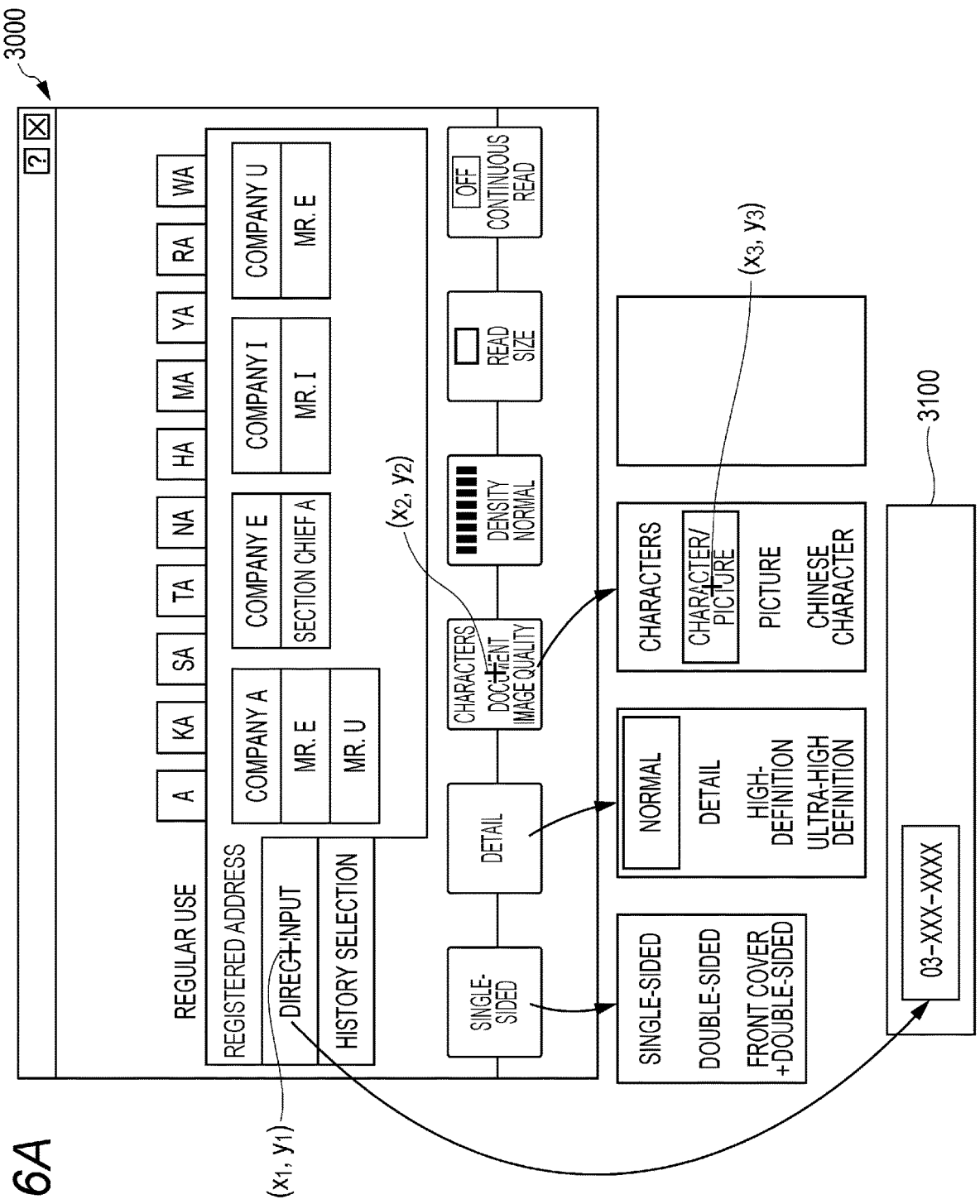

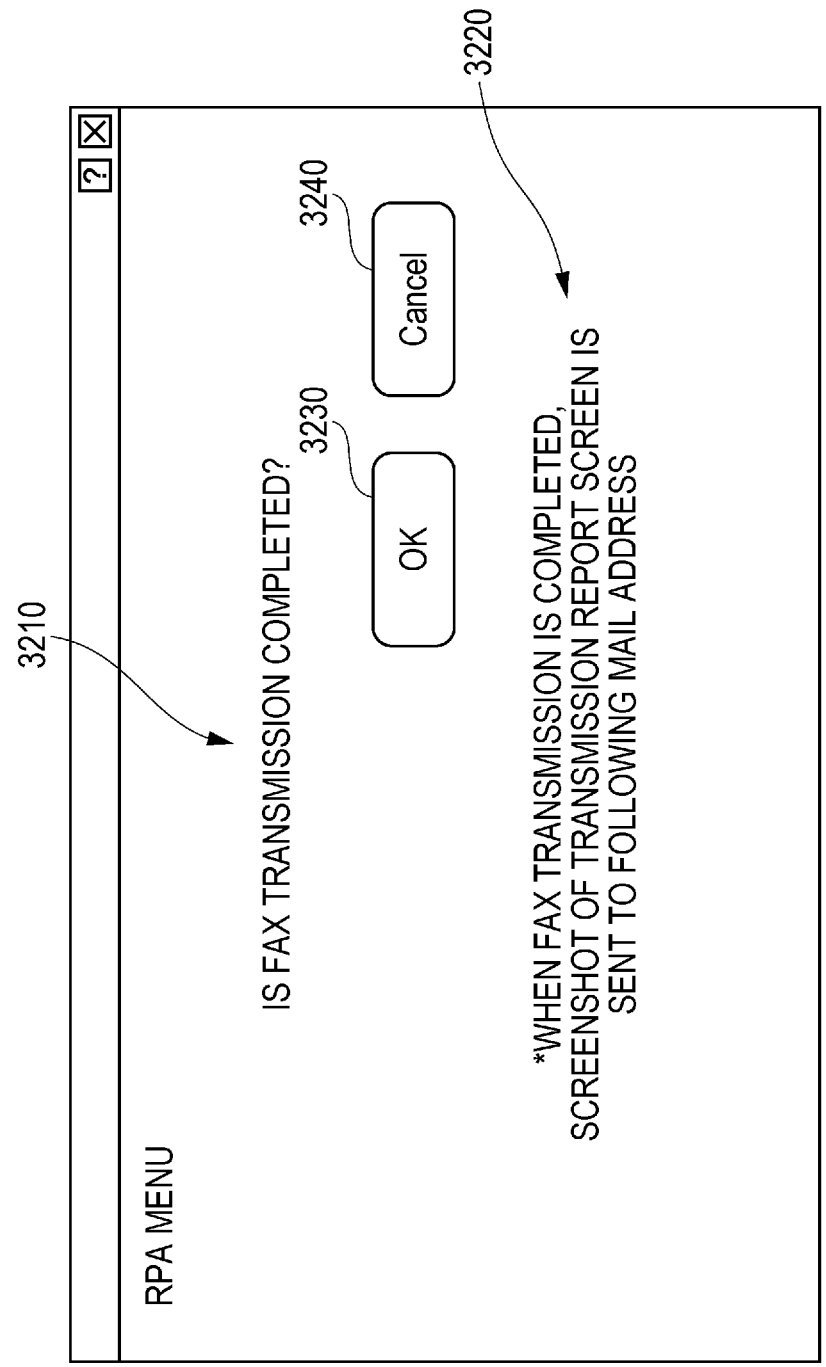

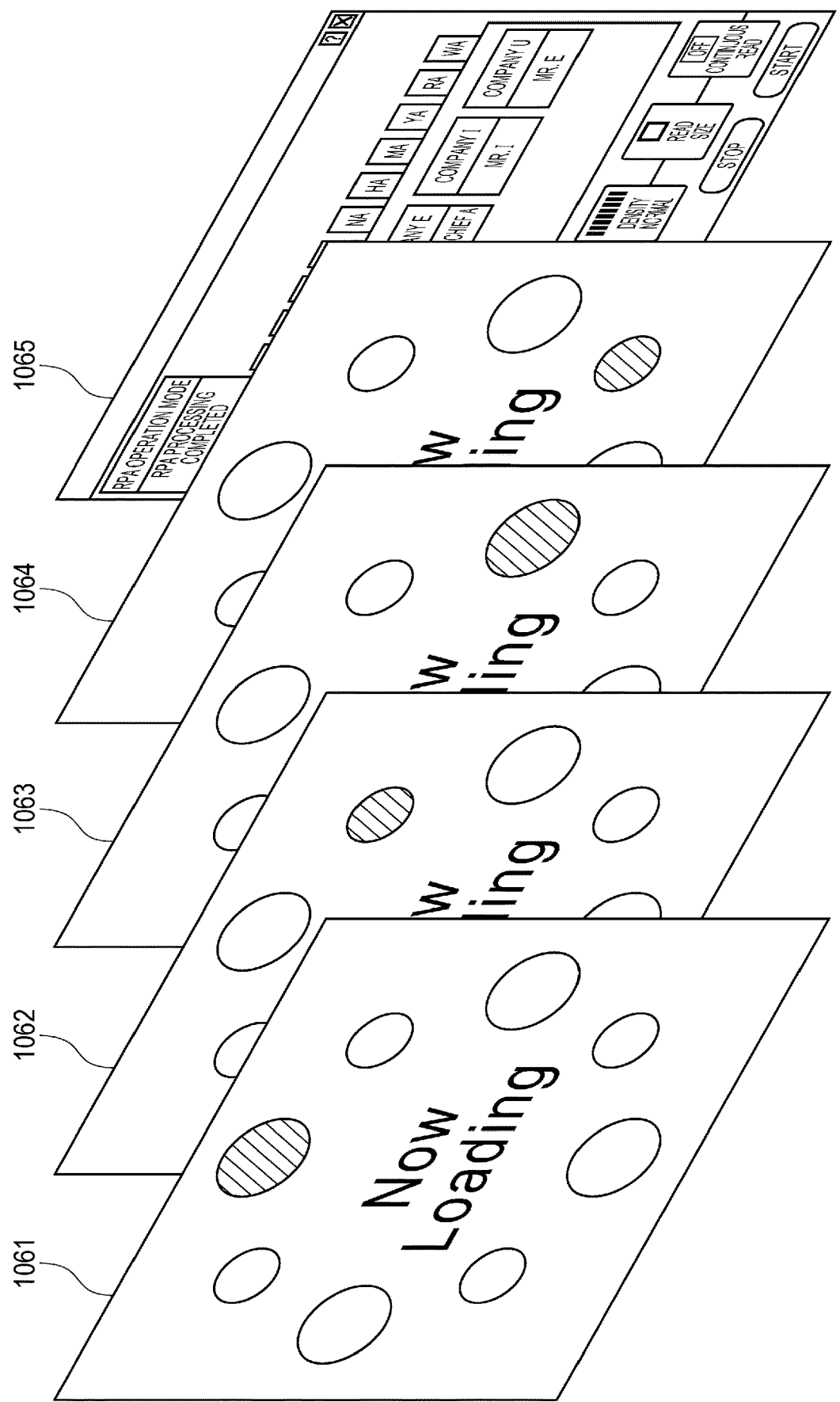

FIG. 12

| |
|---|
| PROCEDURE 1. CHECK AND DISPLAY OF ROM VERSION |
| PROCEDURE 2. PRESENT ROM DOWNLOAD SCREEN AND PROMPT INPUT |
| PROCEDURE 3. Wait DESIGNATION GENERATE CLICK EVENT AT COORDINATES $(x_1, y_1)$ OF IMAGE "SERIAL NUMBER" FROM SERVICE SCREEN |
| PROCEDURE 4. GENERATE EVENT FOR INPUTTING CHARACTERS |
| PROCEDURE 5. GENERATE CLICK EVENT AT COORDINATES $(x_2, y_2)$ OF IMAGE "AUTHENTICATION SETTING" FROM SERVICE SCREEN |
| PROCEDURE 6. GENERATE CLICK EVENT AT COORDINATES $(x_3, y_3)$ OF LOCATION OF IMAGE "CE AUTHENTICATION SETTING" FROM SERVICE SCREEN |
| PROCEDURE 7. GENERATE CLICK EVENT AT COORDINATES $(x_4, y_4)$ OF LOCATION OF IMAGE "FIRST SYSTEM SETTING" FROM SERVICE SCREEN |
| PROCEDURE 8. GENERATE CLICK EVENT AT COORDINATES $(x_5, y_5)$ OF LOCATION OF IMAGE "DESTINATION SETTING" FROM FIRST SYSTEM SETTING |
| PROCEDURE 9. GENERATE EVENT FOR INPUTTING CHARACTERS OF DESTINATION |
| PROCEDURE 10. GENERATE CLICK EVENT AT COORDINATES $(x_6, y_6)$ OF LOCATION OF IMAGE "SECOND SYSTEM SETTING" FROM SERVICE SCREEN |
| PROCEDURE 11. GENERATE CLICK EVENT AT COORDINATES $(x_7, y_7)$ OF IMAGE "SOFTWARE SW SETTING", AND INPUT CHARACTERS OF SETTING VALUE OF SOFTWARE SW WITH CHARACTERS |

FIG. 13

| |
|---|
| PROCEDURE 12. PRESENT SERIAL NUMBER INPUT SCREEN AND PROMPT INPUT |
| PROCEDURE 13. Wait DESIGNATION GENERATE CLICK EVENT AT COORDINATES ($x_2$, $y_2$) OF LOCATION OF IMAGE "SERVICE SCREEN" |
| PROCEDURE 14. GENERATE CLICK EVENT AT COORDINATES ($x_{12}$, $y_{12}$) OF IMAGE "ADMINISTRATOR PASSWORD", AND GENERATE EVENT FOR INPUTTING CHARACTERS OF PASSWORD |
| PROCEDURE 15. GENERATE CLICK EVENT AT COORDINATES ($x_6$, $y_6$) OF LOCATION OF IMAGE "SECOND SYSTEM SETTING" |
| PROCEDURE 16. GENERATE CLICK EVENT AT COORDINATES ($x_{14}$, $y_{14}$) OF LOCATION OF IMAGE "ADF ATTACHMENT SETTING" |
| PROCEDURE 17. GENERATE CLICK EVENT AT COORDINATES ($x_{15}$, $y_{15}$) OF PLACE OF ATTACHED ADF |
| PROCEDURE 18. GENERATE CLICK EVENT AT COORDINATES ($x_{16}$, $y_{16}$) OF IMAGE "STORAGE TYPE SETTING" |
| PROCEDURE 19. GENERATE CLICK EVENT AT COORDINATES ($x_{17}$, $y_{17}$) OF LOCATION OF "ATTACHED STORAGE" |

FIG. 14

| |
|---|
| PROCEDURE 20. PRESENT RESTART INSTRUCTION SCREEN AND PROMPT INPUT |
| PROCEDURE 21. Wait DESIGNATION GENERATE CLICK EVENT AT COORDINATES $(x_{21}, y_{21})$ OF CALL BUTTON ON ADMINISTRATOR SCREEN |
| PROCEDURE 22. GENERATE CLICK EVENT AT COORDINATES $(x_{22}, y_{22})$ OF IMAGE "SETTING MENU" |
| PROCEDURE 23. GENERATE CLICK EVENT AT COORDINATES $(x_{23}, y_{23})$ OF IMAGE "ADMINISTRATOR SETTING" |
| PROCEDURE 24. GENERATE CLICK EVENT AT COORDINATES $(x_{24}, y_{24})$ OF IMAGE "SECURITY SETTING" |
| PROCEDURE 25. GENERATE CLICK EVENT AT COORDINATES $(x_{25}, y_{25})$ OF IMAGE "SIMPLE SECURITY SETTING" |
| PROCEDURE 26. GENERATE CLICK EVENT AT COORDINATES $(x_{26}, y_{26})$ OF IMAGE "SECURITY WARNING DISPLAY" |
| PROCEDURE 27. GENERATE CLICK EVENT AT COORDINATES $(x_{27}, y_{27})$ OF "OFF" |

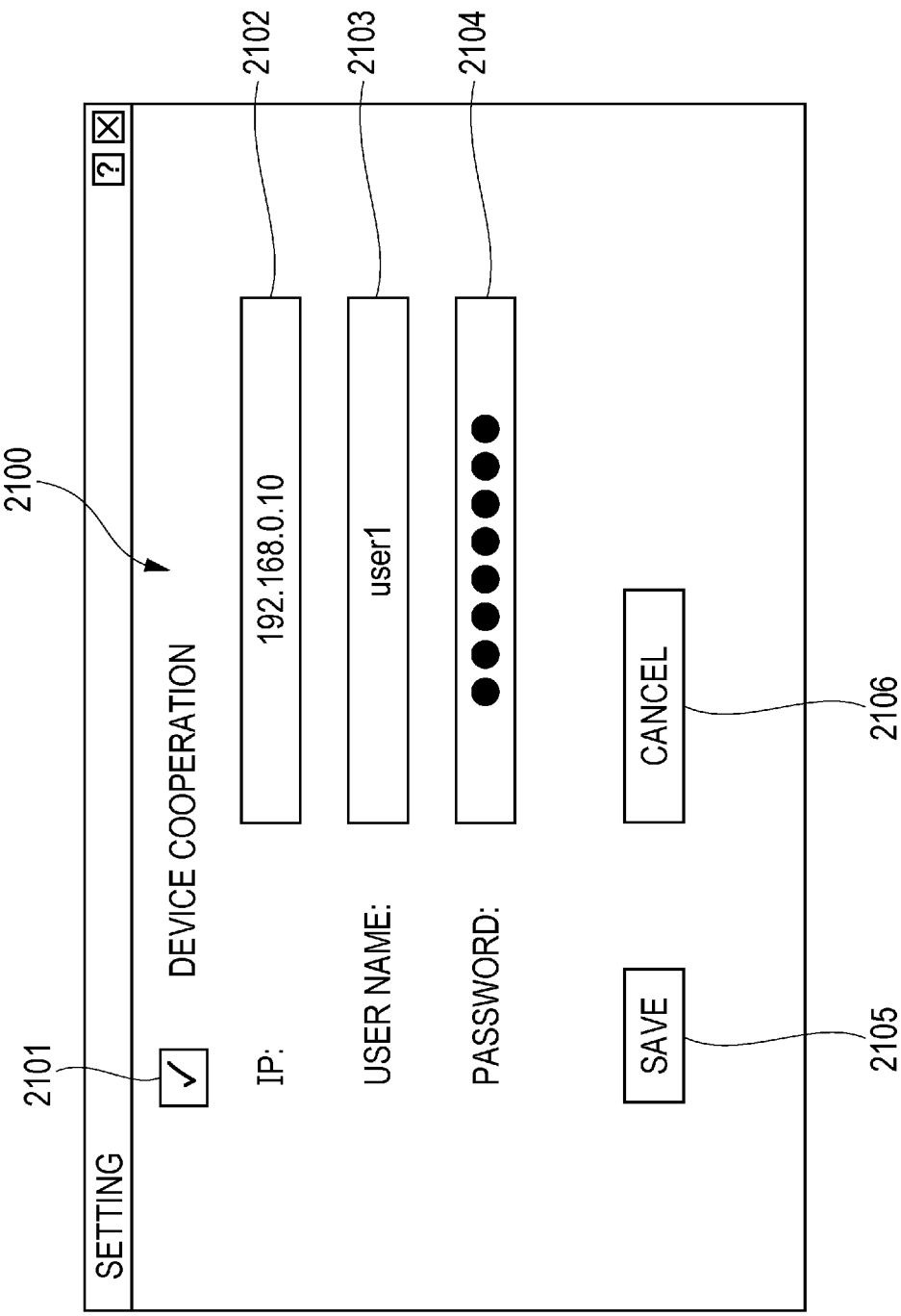

CONTROL METHOD, IMAGE PROCESSING APPARATUS, TERMINAL DEVICE, AND PROGRAM

The entire disclosure of Japanese patent Application No. 2022-095213, filed on Jun. 13, 2022, is incorporated herein by reference in its entirety.

BACKGROUND

Technological Field

The present disclosure relates to improvement in implementation of control in a remote control mode in a system including an image processing apparatus and a terminal device.

Description of the Related Art

The control in a remote control mode is a technology in which a screen (remote panel) having the same contents as an operation screen of an image processing apparatus is displayed on an external device connected to the image processing apparatus, and an operation on the remote panel is received, whereby processing to be executed is instructed to the image processing apparatus. The remote panel may be used for operation by a general user, or may be used by a service person of the image processing apparatus for apparatus setting and maintenance management at the time of introduction of the image processing apparatus.

Even when the installation destination of the image processing apparatus is different, the service person often repeats the same setting work and maintenance work. Therefore, in recent years, studies have been actively conducted to reduce the burden on the service person by operating the remote panel by RPA.

As a prior art of the remote panel, an image processing apparatus and a terminal device described in JP 2016-144097 A are known.

Incidentally, in the conventional remote control mode, the image processing apparatus disables operations other than remote control by the user on a local panel (the operation panel of the apparatus itself). However, since it is inconvenient to prohibit operation on the local panel for an unnecessarily long time, when a situation where there is no operation on the remote panel of the terminal device continues and communication with the terminal device does not occur, the image processing apparatus cancels the remote control mode due to timeout, and enables user operation on the local panel.

On the other hand, when a process on the image processing apparatus side takes time and switching of the remote panel is delayed, a program (referred to as RPA script data) for instructing the RPA to perform an operation procedure can be described such that a script to wait for a process is inserted between a script constituting one operation procedure and a script constituting the next operation procedure, and the screen content of the remote panel is reliably switched.

However, when the script to wait for a process is inserted in this way, the image processing apparatus is not instructed to perform a process while the terminal device side that executes the RPA waits for switching of the remote panel, and thus there is a case where the image processing apparatus cancels the remote control mode due to timeout because there is no communication from the terminal device. When the remote control mode is canceled due to such a timeout of the remote control mode, the operation by the RPA cannot be maintained.

The problem of canceling the remote control mode is not limited to a case where processing on the image processing apparatus side takes time. This also occurs when the operator takes time to set the image processing apparatus and does not operate the image processing apparatus for a long time.

SUMMARY

A first object of the present disclosure is to provide a control method capable of executing a process intended for automation in an RPA without halfway ending the process.

A second object is to provide a terminal device capable of executing the above-described control method.

A third object is to provide an image processing apparatus capable of achieving the same object as that of the control method described above.

A fourth object is to provide a program that can cause a computer to execute the control method described above.

To achieve at least one of the abovementioned objects, according to an aspect of the present invention, a control method for an image processing apparatus having a remote control mode in which a control instruction is received from a terminal device reflecting one aspect of the present invention comprises: causing the image processing apparatus to transition to the remote control mode; receiving, by the terminal device, an operation by RPA and giving a control instruction to the image processing apparatus, wherein the image processing apparatus cancels the remote control mode when a period during which there is no communication with the terminal device reaches a certain period of time, and in the receiving, the terminal device repeats communication with the image processing apparatus at a cycle shorter than the certain period of time after giving the control instruction to the image processing apparatus.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 3A illustrates a software stack of programs installed in an HDD of the terminal device and an HDD of an MFP; FIG. 3B illustrates a connection used for communication between the terminal device and the MFP;

FIG. 5 illustrates an example of a script capable of transmitting a FAX transmission report screen;

FIG. 6A illustrates a FAX top screen to be displayed when FAX is selected as a job type; FIG. 6B illustrates an example of a menu displayed by an RPA tool;

FIG. 10B illustrates a plurality of pieces of image data transmitted by the progress confirmation application in the second embodiment;

FIG. 12 illustrates an example of the RPA script data for performing initial setting;

FIG. 13 illustrates an example of the RPA script data for performing the initial setting;

FIG. 14 illustrates an example of the RPA script data for performing the initial setting;

FIG. 22 illustrates an example of a cooperation setting screen.

DETAILED DESCRIPTION OF EMBODIMENTS

Hereinafter, one or more embodiments of the present invention will be described with reference to the drawings. However, the scope of the invention is not limited to the disclosed embodiments.

[1] System Configuration

Figure 1:
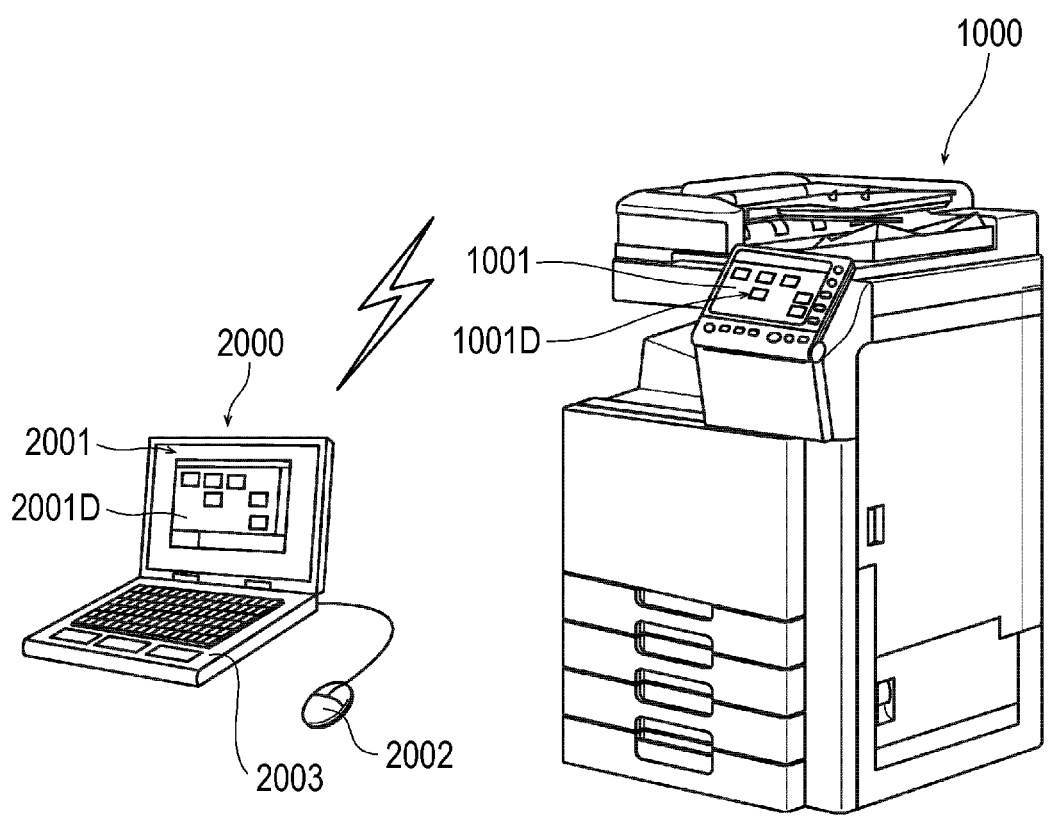
FIG. 1 illustrates a configuration of an RPA system according to the present embodiment.

Hereinafter, embodiments of an image processing apparatus and a terminal device according to the present disclosure will be described with reference to the drawings. FIG. 1 illustrates a configuration of an RPA system according to the present embodiment. As illustrated in this drawing, the RPA system includes an MFP 1000 and a terminal device 2000, and achieves control in a remote control mode.

The multifunction peripheral (MFP) 1000 is an image forming apparatus as one aspect of the image processing apparatus, performs apparatus setting and job setting in accordance with an instruction from a remote panel displayed on the terminal device 2000 in addition to an operation on a touch panel display 1001, and executes a job in accordance with these settings. Examples of the job include scan, copy, FAX, and memory card print. The operation from the touch panel display 1001 and the operation from a remote panel 2001D of the terminal device 2000 are alternative, and operation input from the touch panel display 1001 is not enabled while operation input from the remote panel is enabled.

The terminal device 2000 is used together with the MFP 1000 by a user who operates the MFP 1000, disposes the same remote panel 2001D as the screen 1001D displayed on the touch panel display 1001 of the MFP 1000 on an LCD 2001, receives an operation on the remote panel 2001D from the user, and commands the MFP 1000 to perform a process according to the operation.

[2] Hardware Configuration of Terminal Device 2000 and MFP 1000

Figure 2:
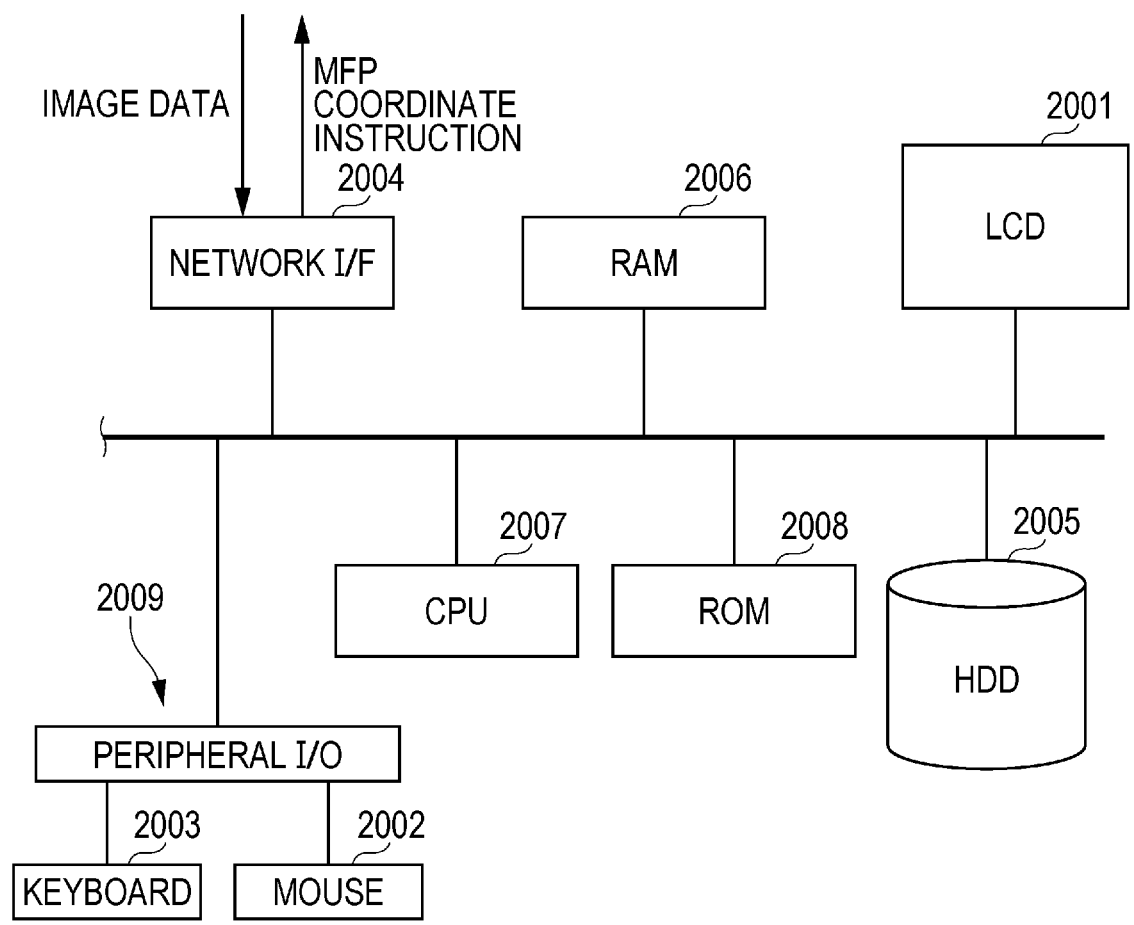
FIG. 2 illustrates a hardware configuration of a terminal device.

FIG. 2 illustrates a hardware configuration of the terminal device 2000. As illustrated in the drawing, the terminal device 2000 includes an LCD 2001 that provides an interactive operation environment to the user, a mouse 2002 that is an example of a pointing device, a keyboard 2003, a network I/F 2004, an HDD 2005 in which various programs are installed, a RAM 2006 on which necessary programs among the programs installed in the HDD 2005 are loaded, a CPU 2007 that executes the programs loaded in the RAM, a flash ROM 2008 for storing necessary settings when executing the programs, and a peripheral I/O 2009 for receiving an input operation on the mouse 2002 and the keyboard 2003.

The network I/F 2004 is a communication module that performs LAN connection and WAN connection. The communication module includes a near field communication module such as Bluetooth (registered trademark), Wi-Fi, EnOcean, or specified low power (Wi-SUN), and executes transmission and reception of operation information and image data via radio.

The MFP 1000 also has a hardware configuration (in addition to the touch panel display 1001, a network I/F 1004, an HDD 1005, a RAM 1006, a CPU 1007, and a ROM 1008 illustrated in FIG. 3A) similar to that of the terminal device 2000, and a necessary program is installed in the HDD 1005.

[3] Software Stack

FIG. 3A illustrates a software stack of programs installed in the HDD 2005 of the terminal device 2000 and the HDD 1005 of the MFP 1000.

The software stack of the terminal device 2000 has a control hierarchy in which an operating system (OS) 2200 is arranged on hardware 2100 of the terminal device 2000, and an application 2300 is arranged thereon.

As in the terminal device 2000, the software stack of the MFP 1000 has a control hierarchy in which an OS 1200 is arranged on hardware 1100 of the MFP 1000, and an application 1300 is arranged thereon.

The OS 2200 of the terminal device 2000 and the OS 1200 of the MFP 1000 execute data communication by a protocol stack via the network I/Fs 2004 and 1004. The applications 2300 and 1300 establish a TCP connection 2104 by TCP protocols 1134 and 2034, IP protocols 1124 and 2024, and near field communications 1114 and 2014, and transmit and receive an HTTP message through the TCP connection 2104.

The TCP connection 2104 is established in such a manner that the terminal device 2000 is on the host side, the application 2300 designates the port number of the TCP port of the counterpart application 1300 and its own port number to issue a connection request, and the application 1300 confirms that the port requested from the connection side is waiting for connection and returns a progress report message.

The application 2300 operating on the terminal device 2000 and the application 1300 operating on the MFP 1000 use the TCP connection 2104 for transmission and reception of image data and operation information using the port number designated by the host side at the time of connection.

On the other hand, since the TCP connection 2104 has a time limit, the TCP connection 2104 is disconnected when there is no transmission or reception of data in a predetermined time.

(3-1) Software Stack of Terminal Device 2000

The OS 2200 includes a kernel 2210 and a multi-window system 2220.

The kernel 2210 allocates a plurality of partial areas of the RAM 2006 to each application, starts a plurality of applications, and monitors the operation of each application.

When commanded to open a file or start an application, the multi-window system 2220 opens a new window and allocates an area inside the window to the opened file or application.

Representative examples of the application 2300 managed by the kernel 2210 include the remote panel application 2400 and the RPA tool 2500.

The remote panel application 2400 arranges a remote panel, which is the same screen as the screen displayed on the MFP 1000, in one of the windows provided by the multi-window system 2220, and causes the user to perform remote control.

The remote control is achieved by transmitting and receiving data to and from the MFP 1000. The data transmission and reception includes transmission of operation data indicating an operation performed on the terminal device 2000 by the operator, and reception of screen data after switching (after transition) when the MFP 1000 that has received the operation data switches the screen. By repeating such data transmission and reception, a screen transition similar to the screen transition in the MFP 1000 is achieved on the terminal device 2000.

The RPA tool 2500 creates RPA script data 2600 for screen data of the MFP 1000 received by the remote panel application 2400, and executes control in the remote control mode based on the RPA script data 2600. In creating the RPA script data 2600, the screen data of the MFP 1000 is displayed on the screen of a remote terminal, a user operation on the screen data is received, coordinates of a position where an input such as a touch is made by the user operation are detected, and a script is created from the detected coordinate information. Script creation from such coordinate information is repeated to obtain the RPA script data 2600.

On the other hand, in executing the RPA script data, the coordinate information of each script constituting each procedure of the RPA script data is transmitted to the remote panel application, and remote control based on the coordinate information is executed by the remote panel application.

(3-2) Software Stack of MFP 1000

The program installed in the HDD 1005 of the MFP 1000 also has a software stack similar to that of the terminal device 2000. Specifically, the OS 1200 is arranged in the hardware 1100 of the MFP 1000, and the application 1300 is arranged therein. The application 1300 includes an MFP panel application 1400, a process execution application 1500, and a progress confirmation application 1700, and the OS 1200 includes an operation system control unit 1600.

The MFP panel application 1400 corresponds to the remote panel application 2400, and causes the process execution application 1500 to execute a process necessary for apparatus setting or a job by either an operation performed on the touch panel display 1001 by the operator or an operation performed on the remote panel in the remote panel method.

The process execution application 1500 executes panel setting in accordance with an operation input made to the MFP panel application 1400, and executes apparatus setting and a job when the MFP 1000 is installed in an office.

The operation system control unit 1600 is one of basic input/output programs in the OS 1200, and switches whether to operate the MFP panel application 1400 by local control from the touch panel display 1001 or to operate the MFP panel application 1400 by remote control from the remote panel application 2400. By default, the MFP panel application 1400 is operated by the local control from the touch panel display 1001. On the other hand, when start of the RPA control mode is requested from the RPA tool 2500, local control from the touch panel display 1001 is prohibited, and the MFP panel application 1400 is caused to perform a job or device setting by remote control from the remote panel application 2400. The operation system control unit 1600 includes a non-input period counter 1610 and monitors whether operation from the remote panel application 2400 is continuously performed. When there is no remote control to the MFP panel application 1400, the non-input period counter 1610 starts counting of how long a non-input period in which there is no remote control continues, and when the counted value reaches a predetermined upper limit value (timeout time), the remote control mode times out. Specifically, the operation input from the remote panel application 2400 is invalidated, and the operation with the touch panel display 1001 is enabled.

In the RPA control mode, even if the non-input period continues for a long time, the progress confirmation application 1700 executes control to prevent the switching to the touch panel display 1001 by the operation system control unit 1600 and maintain the operation input by the remote panel application 2400. Such control is performed in cooperation with the RPA tool 2500. Hereinafter, control for maintaining the operation input in the remote control mode will be described with reference to sequence diagrams of FIGS. 4A and 4B.

[4] A device cooperation diagram 4A by the remote panel application 2400 and the RPA tool 2500 illustrates a sequence when the process on the MFP 1000 side is performed without delay and there is almost no non-input period.

The sequence in this case includes a phase of establishing connection between the RPA tool 2500 and the MFP panel application 1400 and a phase of instructing the MFP panel application 1400 to perform a process through the remote panel application 2400.

In the former phase, the RPA tool 2500 transmits an MFP connection request message 2401 to the MFP panel application 1400, and the MFP panel application 1400 transmits a connection permission message 1010 to the RPA tool 2500 as a response.

Figure 4A:
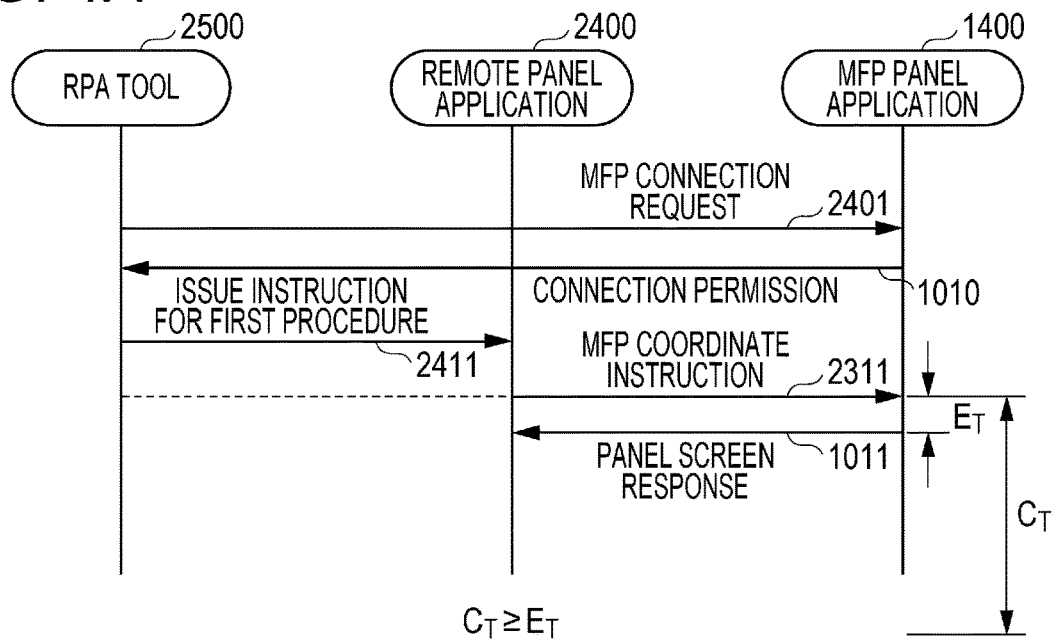
FIG. 4A illustrates a sequence when a process on the MFP side is performed without delay and there is almost no non-input period.

In the latter phase, after the remote panel application 2400 issues an instruction message 2411 of the first procedure and the remote panel application 2400 transmits an MFP coordinate instruction 2311 to the MFP 1000, the MFP panel application 1400 transmits a panel screen response message 1011 to the remote panel application 2400 as a response. The time from when the MFP panel application 1400 receives the MFP coordinate instruction 2311 until when the MFP panel application 1400 transmits the panel screen response message 1011 is the processing time in the MFP 1000 (this processing time is referred to as Et). On the other hand, when the MFP coordinate instruction 2311 is received, the non-input period counter 1610 starts clocking the non-input period. Ct is a threshold value of the non-input period. In the case of FIG. 4A, the time from reception of the MFP coordinate instruction 2311 to transmission of the panel screen response message 1011 is short, and thus counting of the non-input period does not time out.

Figure 4B:
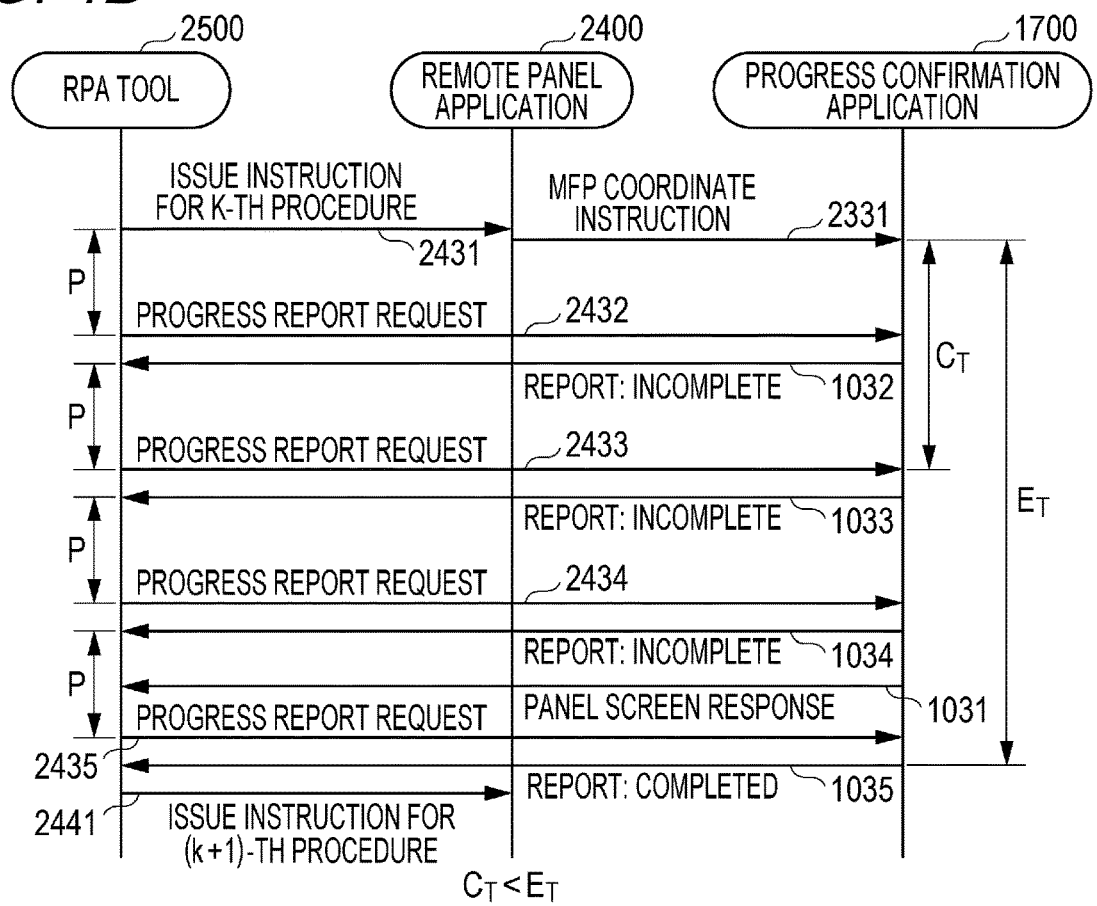
FIG. 4B illustrates a case where processing time Et of the MFP is longer than a timeout value Ct of the non-input period.

FIG. 4B illustrates a case where the processing time Et from when the MFP panel application 1400 receives the MFP coordinate instruction 2311 to when the MFP panel application transmits a panel screen response message 1031 is longer than the timeout value Ct in the non-input period. Such a case occurs when the process execution application 1500 takes time for the processing instructed from the RPA tool 2500, the TCP connection is disconnected, and the non-input period continues for a long time.

Since the processing time Et becomes longer, the count value in the non-input period from the MFP coordinate instruction 2311 becomes the threshold value Ct, and in this state, the operation input to the MFP panel application 1400 is switched from the remote control to the local control. In order to avoid such switching, the progress confirmation application 1700 starts clocking of a transmission cycle P, and transmits the progress report request message 2432 to the MFP 1000 when the control cycle P has elapsed. The transmission cycle P is a time (for example, about 10 seconds) shorter than the above-described non-input period threshold value Ct. When the progress report request message 2432 is transmitted, the progress confirmation application 1700 returns a progress report message 1032 indicating processing incompletion.

When receiving the progress report message 1032 indicating incompletion, the RPA tool 2500 transmits a progress report request message 2433 to the progress confirmation application 1700 again after the transmission cycle P elapses. When the progress report message 1033 is received from the progress confirmation application 1700, a progress report request message 2434 is transmitted to the MFP 1000 after the transmission cycle P has elapsed. Thus, even if a long time is necessary for the process on the MFP 1000 side, it is possible to prevent the process from timing out in the middle.

When the process execution application 1500 finishes executing the process instructed from the remote panel application 2400, the panel screen is switched according to an MFP coordinate instruction 2331, and the panel screen response message 1011 is returned to the remote panel application 2400. After the instructed process is completed, when a next progress report request message 2435 is transmitted from the RPA tool 2500 to the MFP panel application 1400 of the MFP 1000, a progress report message 1035 indicating that the process has been completed is returned.

When a notification of the progress report message 1035 indicating completion is given from the MFP 1000, the RPA tool 2500 executes the next script in the RPA script data and issues an instruction message 2441 of the (k+1)th procedure.

[5] Processing Procedure of RPA Tool 2500

(5-1) Example of RPA Script Data

The RPA script data 2600 includes a script indicating a series of operations performed by the user. FIG. 5 illustrates an example of RPA script data for causing the MFP 1000 to perform FAX transmission. Hereinafter, a description example of the RPA script data will be described with reference to FIG. 5.

Procedure 1 of the RPA script data of FIG. 5 is described by a script of contents instructing to generate a click event at coordinates (x1, y1) of a UI image "direct input" from a FAX top screen 3000 illustrated in FIG. 6A, for example, a script of contents calling a click function in PYAutoGUI. The format of the click function is as follows, and an operation event specified by an argument clicks is generated by the time interval designated by the argument interval at coordinates (x, y) specified by the argument.

click(x,y,button,clicks=right/left,interval)

Procedure 2 is described by a script of contents instructing to generate an event for inputting a character string 03-XXX-XXXX, for example, a script of contents calling a write function and a press function in PYAutoGUI.

The format of the write function is as follows, and the character string designated by the argument is output.

write("character string"):

The format of the press function is as follows: Input key code of the key designated by argument KEYBOARD_KEY press("KEYBOARD_KEY")

Procedure 3 includes a script that commands generation of a click event from the FAX top screen 3000 at coordinates (x2, y2) of the location where the image "document image quality characters" are located. Procedure 3 includes a script for calling the click function, similarly to Procedure 1.

Procedure 4 includes a script for commanding generation of a click event at coordinates (x3, y3) of the location where the image "character/picture" is located from the desktop screen, for example, a script for calling the click function as in Procedure 1. The RPA tool 2500 interprets and executes the script of Procedure 4, thereby issuing an MFP coordinate instruction indicating that coordinates (x3, y3) are touched to the MFP panel application 1400.

Procedure 5 includes a script for displaying the menu (RPA menu) of FIG. 6B. The script of Procedure 5 calls the following function.

Prompt(text="character string", title="character string", default="character string")

This function pops up a menu of a title name of the argument title to display a character string designated by the argument text, receives text input, and receives input of an OK button and a Cancel button. An example of the menu displayed in Procedure 5 is illustrated in FIG. 6B. This menu includes a character string 3210 of "is FAX transmission completed?" and a character string 3220 of "send a screenshot of a transmission report screen to an e-mail address", where an OK button 3230 receives an instruction that the FAX transmission has been completed, and a cancel button 3240 receives an instruction to cancel the transmission of the transmission report.

Procedure 6 is a procedure for acquiring a screenshot of the transmission report screen. The acquisition of screenshots is described using the following functions:

Screenshot ("FILE NAME", region=(upper left coordinate, width, height))

A screenshot of a designated range of width×height is performed from upper left coordinates designated by an argument region, and resultant pixels are saved with the file name designated by the argument. The screen data transmitted from the MFP 1000 is saved using this screenshot. In FAX, several hundred documents may be transmitted, and it may take time to transmit the transmission report among the procedures of the RPA script data. Therefore, before Procedure 6, a script to wait for the process (wait designation) on the MFP side is inserted. In the wait designation, a waiting time is designated in units of seconds, and the RPA tool is caused to wait during the waiting time. Thus, the issuance of the script forming the procedure of the next rank or higher is delayed.

By inserting the script to wait for the process on the MFP side, the script constituting Procedure 6 is issued to the RPA tool 2500 after this wait period has elapsed.

Procedure 7 is a procedure for transmitting the image file of the screenshot to the destination aaa@bbb.co.jp.

[6] Processing Procedure by RPA Tool 2500

Figure 7:
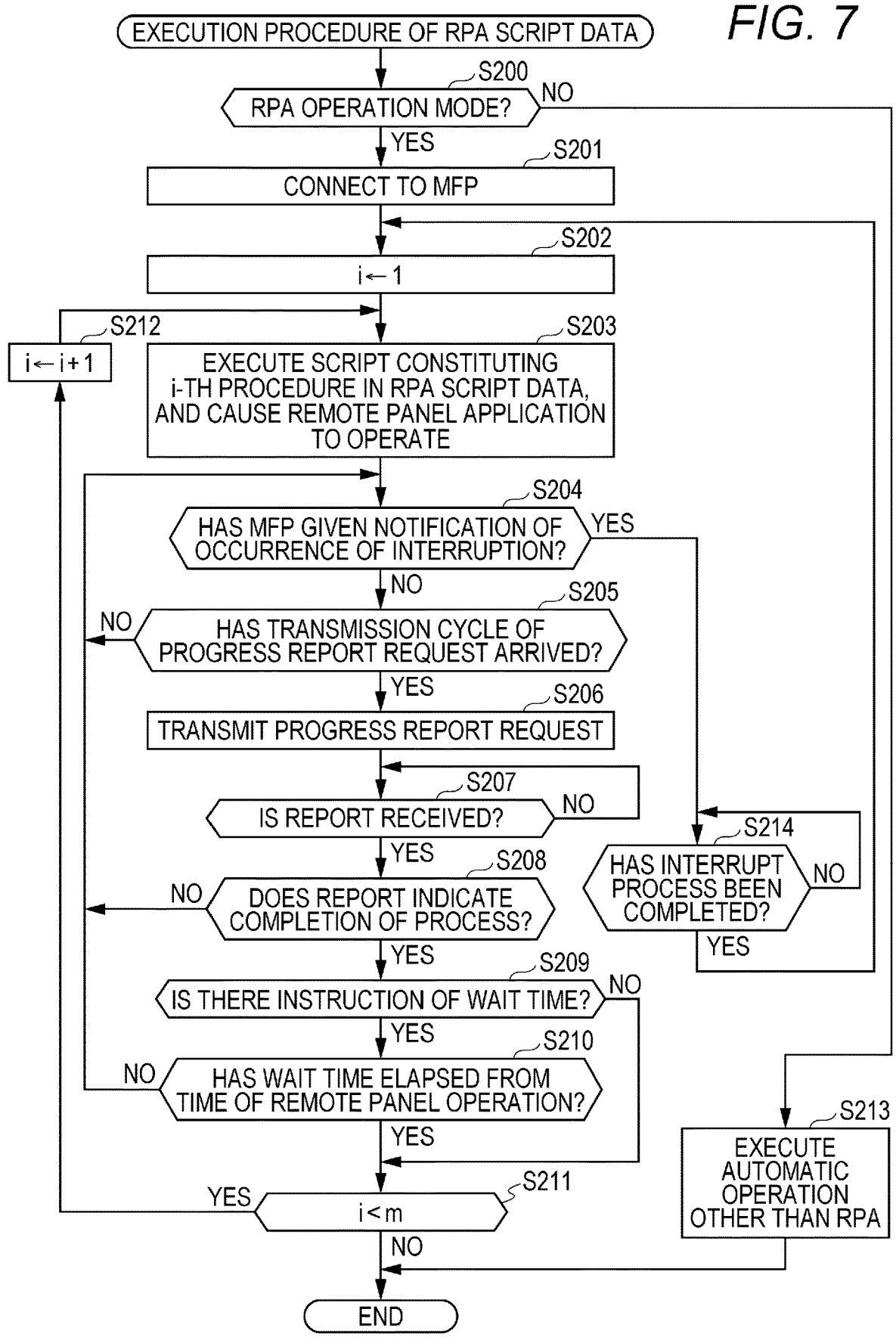
FIG. 7 is a flowchart illustrating an execution procedure of RPA script data.

FIG. 7 illustrates an execution procedure of the RPA script data by the RPA tool 2500. FIG. 7 is a flowchart illustrating a processing procedure of the RPA tool 2500.

A variable i indicates an individual procedure indicated in one RPA script column, and changes in a range from 1 to m. In this flow, this variable i is used as a control variable.

The processing procedure by the RPA tool 2500 has a processing structure in which it is determined whether or not it is the RPA control mode (step S200), and when it is the RPA control mode (Yes in step S200), it is connected to the MFP 1000 (step S201), the variable i is initialized with 1 (step S202), and the loop of steps S203 to S209 is executed, and when it is not the RPA control mode (No in step S200), general RPA processing (step S213) is executed.

The process repeated in the loop of steps S203 to S209 is as follows. The script constituting the i-th procedure in the RPA script data is executed, and the remote panel application 2400 is caused to operate the remote panel (step S203).

When i=1 and the script constituting Procedure 1 in FIG. 5 is executed, the remote panel application 2400 transmits coordinate information indicating the coordinates (x1, y1) of the UI image to the MFP panel application 1400 of the MFP 1000. The MFP panel application 1400 instructs the remote panel application 2400 of the terminal device 2000 to perform a process to be executed when the UI image is operated and input, here, switching the screen to a FAX number input screen 3100. The remote panel application 2400 instructs the MFP panel application 1400 to transition from the FAX top screen 3000 of FIG. 6A to the FAX number input screen 3100. By transmitting the image data indicating the screen after the transition to the remote panel application 2400, the FAX top screen 3000 of FIG. 6A is switched to the FAX number input screen 3100.

The loop of steps S204 to S205 is repeated. In the loop of steps S204 to S205, a determination as to whether the MFP 1000 has given a notification of the occurrence of interruption (step S204) or whether the transmission cycle of the progress report request message has elapsed (step S205) is repeated. The interruption in step S204 means that another user presses a stop key of the MFP 1000 to stop the execution of the currently executed job, and a job is commanded by the another user. In step S214, the process waits for the end of the interruption processing. On the other hand, when the transmission cycle of the progress report request message arrives (Yes in step S205), the progress report request message is transmitted (step S206), and it is waited to receive the progress report message (step S207). When the progress report is received (Yes in step S207), it is determined whether the received progress report indicates process completion (step S208).

When there is no notification of process completion (No in step S208), the process returns to step S204, and steps S204 to S205 are repeated. While a notification of incompletion of the i-th script is given, steps S204 to S208 are repeated.

When a notification of process completion of the i-th script is given (Yes in step S208), it is determined whether or not there is an instruction of a wait (step S209), and when there is no instruction of wait (No in step S209), the process proceeds to step S211. Step S211 is a determination as to whether the variable i is less than the variable m. When the variable i is less than m (Yes in step S211), the variable i is incremented (step S212), and the next script is executed.

When there is a wait designation in the i-th script (Yes in step S209), step S210 is a determination as to whether the wait time has elapsed. When the wait time has not elapsed (No in step S210), the process returns to step S204 and continues the loop of steps S204 to S205.

When the wait time has elapsed (Yes in step S210), the process proceeds to step S211. Step S211 determines whether the variable i is less than m. By repeating steps S203 to S212, even when the wait has elapsed in the script, the process completion in the MFP 1000 can be completed.

(6-1) Processing Procedure of Progress Confirmation Application 1700

Figure 8:
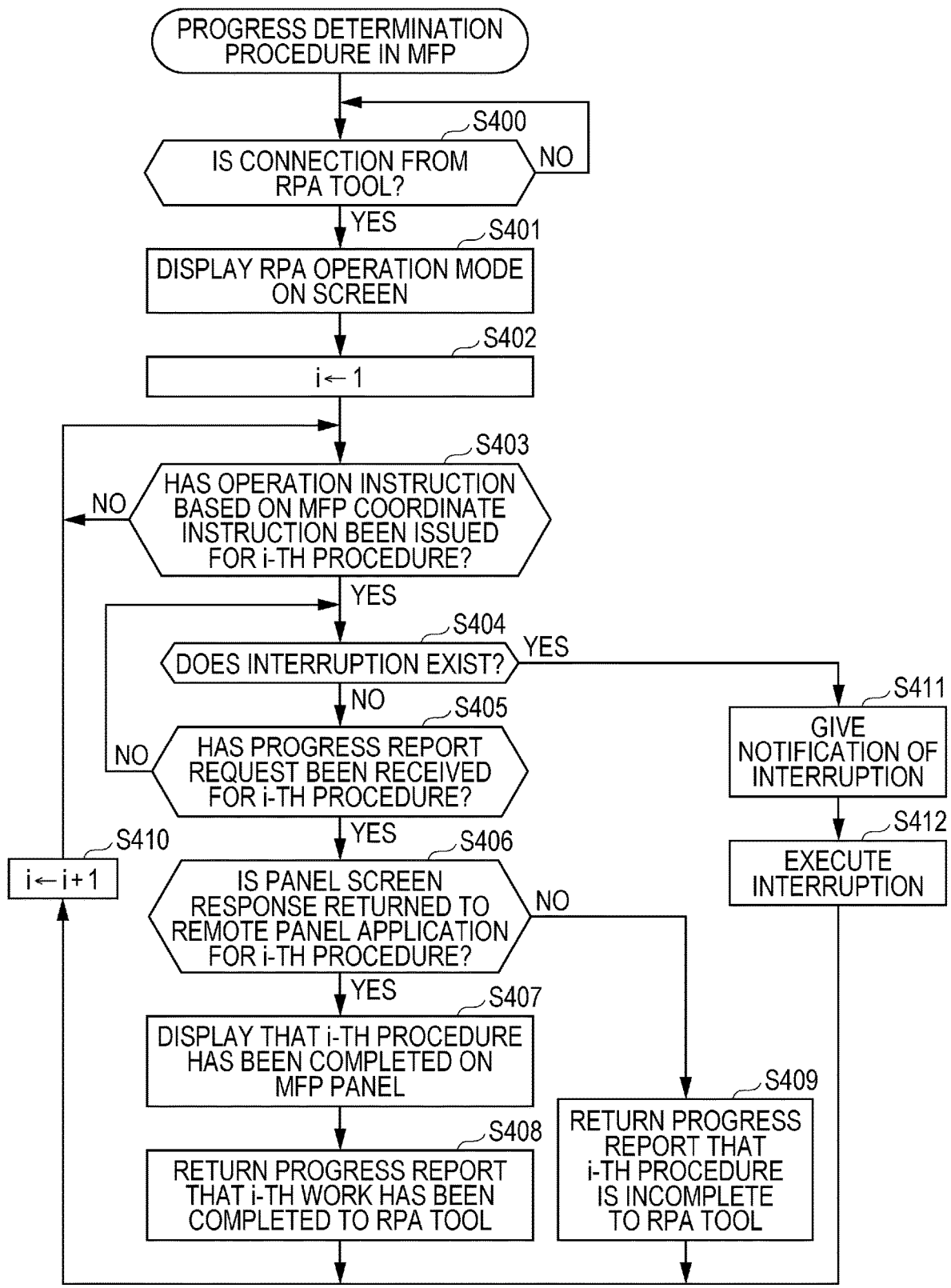
FIG. 8 is a flowchart illustrating a progress confirmation procedure of the MFP.

FIG. 8 is a flowchart illustrating a progress report request message transmission procedure of the MFP. Waiting for connection from the RPA tool (No in step S400), and when the connection is made (Yes in step S400), the RPA control mode is displayed on the screen (step S401). After the variable i is initialized to 1 (step S402), it is determined whether an instruction based on the MFP coordinate instruction has been issued (step S403), and when the instruction has been issued (Yes in step S403), the process proceeds to a loop of steps S404 to S405. In the loop, the determination as to whether the interruption has been performed (step S404) or the i-th progress report request message has been received (step S405) is repeated. When the interruption has been performed (Yes in step S404), the RPA tool 2500 is notified of the interruption (step S411), and the interruption is executed (step S412).

When the progress report request message is received (Yes in step S405), it is determined whether a panel screen response message has been returned to the remote panel application 2400 for the i-th procedure (step S406). When the panel screen response message has been returned (Yes in step S406), the fact that the execution of the script i has been completed is displayed on the MFP panel (step S407), and the fact that the i-th work has been completed is returned to the RPA tool 2500 (step S408).

On the other hand, when the process is incomplete (No in step S406), the process incompletion is returned to the RPA tool (step S409).

Figure 9A:
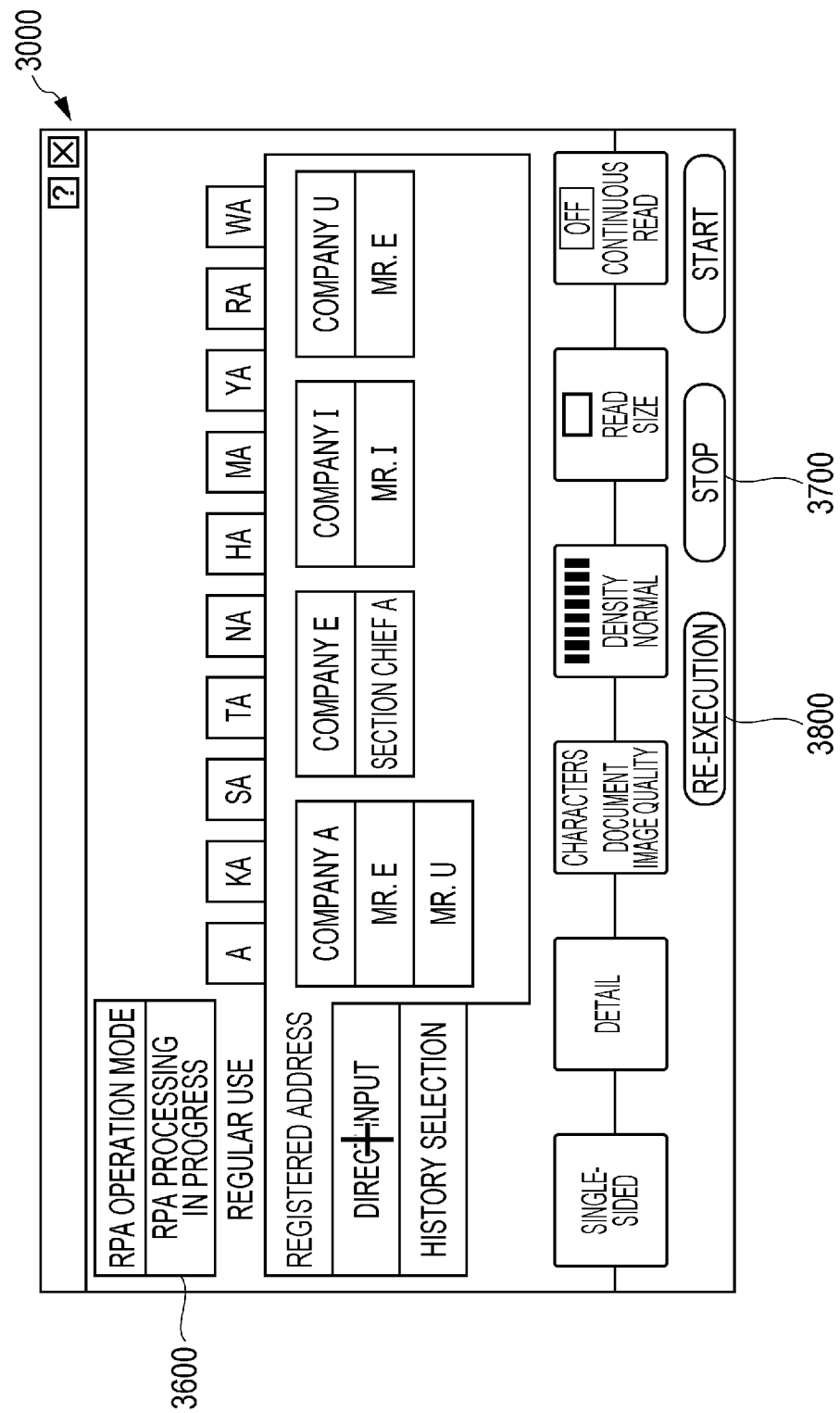
FIG. 9A illustrates a remote panel displayed on the terminal device when the RPA script data is being executed.

FIG. 9A illustrates a remote panel displayed on the terminal device 2000 when the RPA script data is being executed. As illustrated in the drawing, an indicator 3600 indicating that the RPA operation is being performed is displayed in the upper portion of the screen, and a stop button 3700 for receiving stop of execution of the RPA script data and a button 3800 for receiving re-execution after the stop are arranged in the lower portion. Even when the RPA tool 2500 is executing the RPA script data, the user can monitor whether the RPA script data is correctly executed by looking at the remote panel, and when there is a problem, the execution of the RPA script data can be stopped by pressing the stop button 3700.

Figure 9B:
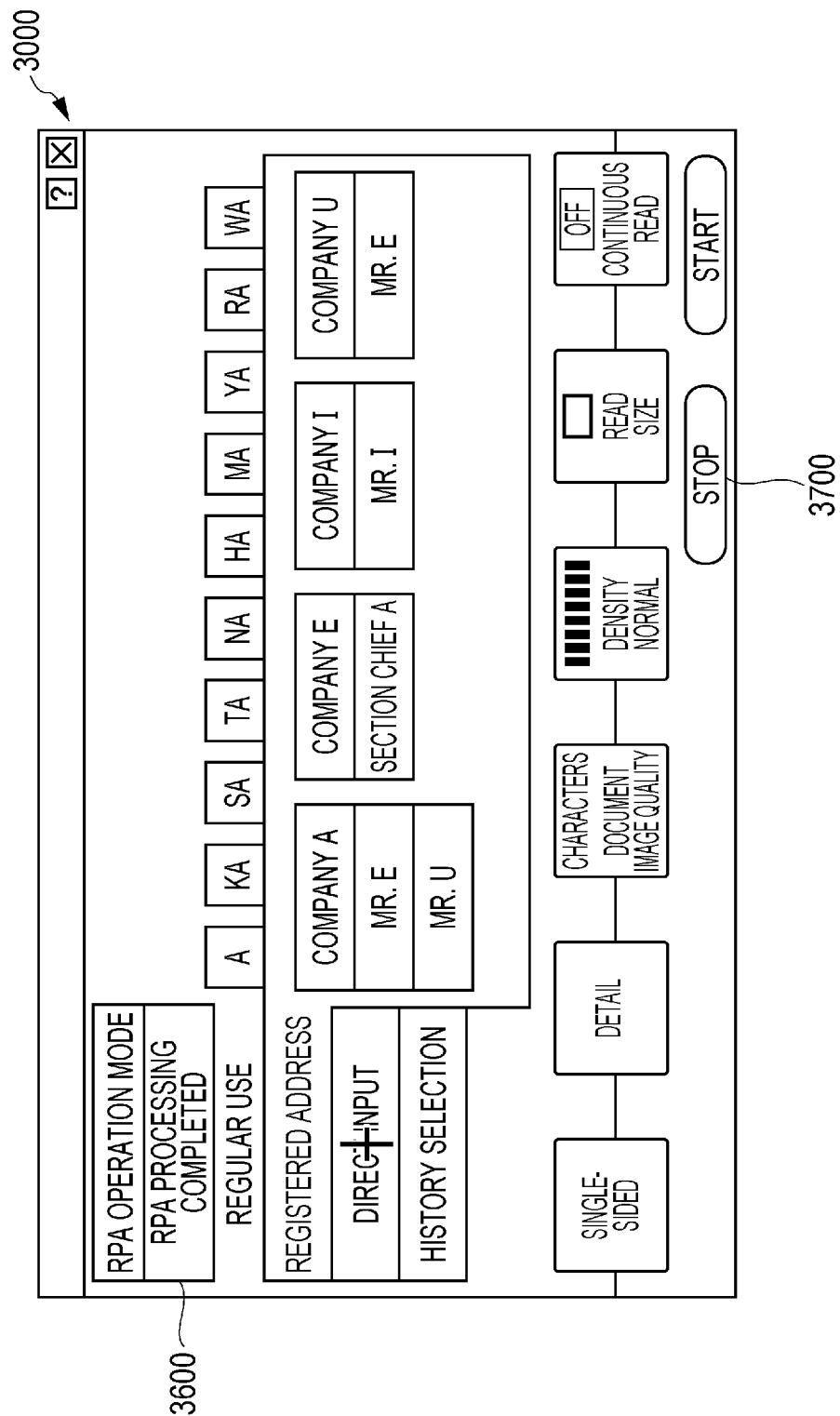
FIG. 9B illustrates the remote panel in a state in which the execution of the RPA script data is completed.

FIG. 9B illustrates the remote panel in a state in which the execution of the RPA script data is completed. As illustrated in the drawing, the indicator 3600 is switched to the RPA process completion and indicates that the execution of the RPA script data is completed.

(6-2) Summary

Even when the wait is in the RPA for a long period, the progress report request messages 2432, 2433, 2434, and 2435 and the incomplete messages 1032, 1033, 1034, and 1035 are communicated in a cycle less than the timeout value of the non-input period as illustrated in FIG. 4B, so that the operation input to the MFP panel application 1400 is maintained in a state of receiving the instruction input from the remote panel without switching from the remote panel to the local panel. In this manner, even when the process on the MFP 1000 side takes time, and the menu on the RPA side is waiting for completion of the process on the MFP 1000 side, the input to the MFP panel application 1400 is not switched from the remote panel to the local panel. Therefore, even after the MFP 1000 finishes the process over a long time, a series of procedures described in the RPA script data is executed without interruption.

[7] Second Embodiment

In the first embodiment, the progress report indicating whether or not the process commanded by the RPA tool 2500 has been completed is received from the MFP 1000, and it is determined whether or not to instruct the next procedure. On the other hand, in the second embodiment, the contents of the touch panel display 1001 of the MFP 1000 are transmitted to the remote panel application 2400.

(7-1) Communication Sequence in Second Embodiment

Figure 10A:
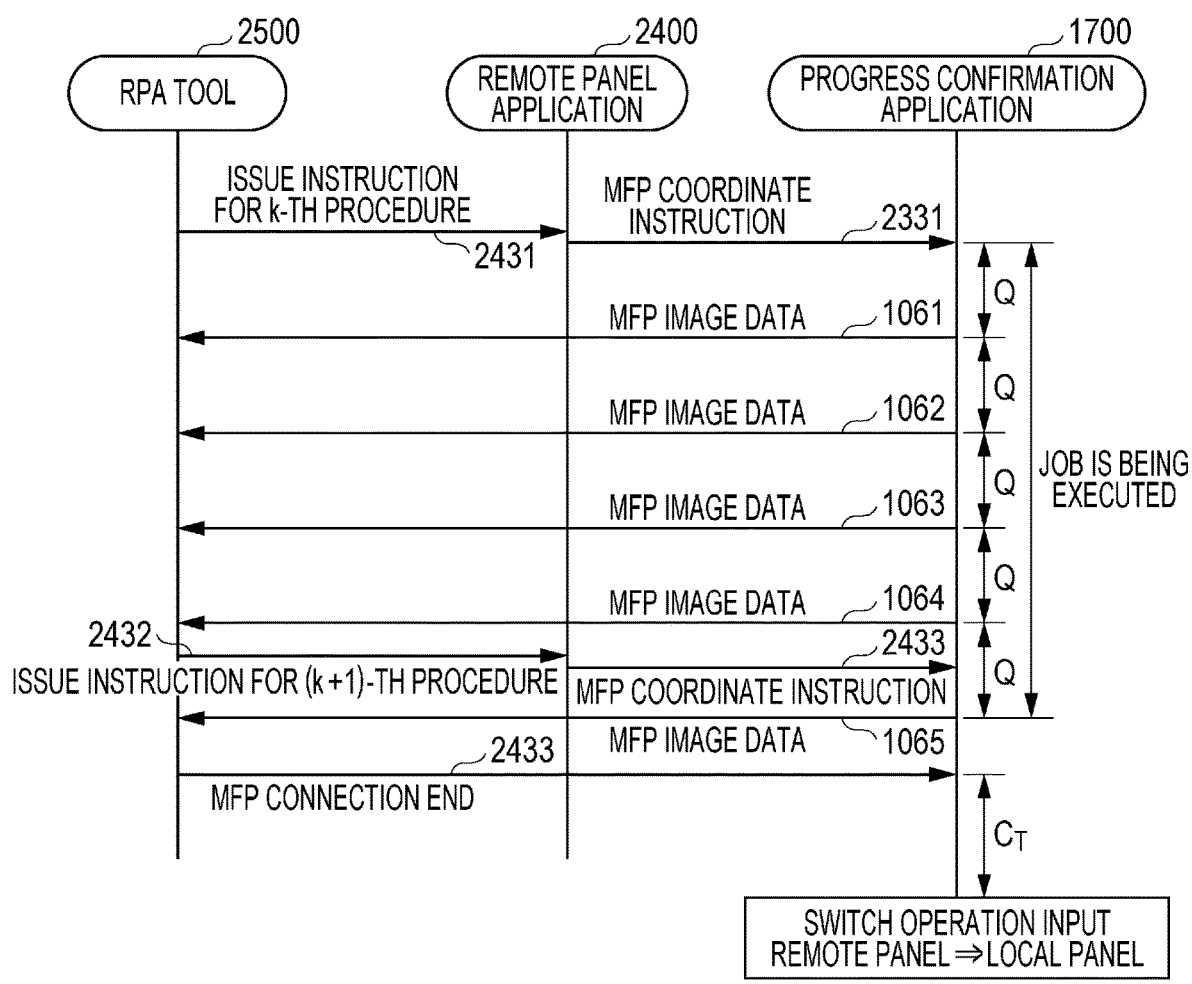
FIG. 10A illustrates a communication sequence performed among the RPA tool, a remote panel application, and a progress confirmation application in a second embodiment.

FIG. 10A illustrates a communication sequence performed among the RPA tool 2500, the remote panel application 2400, and the progress confirmation application 1700 in the second embodiment. This drawing is based on the sequence diagram of FIG. 4B, and only the part of the sequence diagram of FIG. 4B from when the instruction message 2431 of the kth procedure is issued and the MFP coordinate instruction 2331 is issued to when the instruction message 2432 of the (k+1)th procedure is issued and the MFP coordinate instruction 2433 is issued is illustrated. Meanwhile, in the second embodiment, the progress confirmation application 1700 transmits screen data 1061, 1062, 1063, and 1065 indicating that the process is in progress to the RPA tool 2500. Further, the screen data 1065 indicating process completion is transmitted. While such screen data transmission is repeated, the operation input to the MFP panel application 1400 is in a state switched to the remote panel side, and thus, when the image data 1064 is transmitted, upon ending of the process on the MFP side, the RPA tool 2500 instructs the MFP panel application 1400 to perform the operation of the (k+1)th procedure, which is the next procedure in the RPA script data, on the remote panel and perform the process according to the operation.

The content of pieces of image data 1061 to 1064 to be transmitted in each transmission cycle is as illustrated in FIG. 10B, and includes a character string of Now Loading and nine circles arranged around the character string, and the colors of the nine circles change for each image data. By displaying such image data on the remote panel by the remote panel application 2400, it becomes clear that processing is currently being performed on the image processing apparatus side.

Thereafter, in FIG. 10A, when all the procedures described in the RPA script data are executed and the RPA tool 2500 gives a notification of release 2433 of the RPA control mode, the progress confirmation application 1700 ends the transmission of the image data indicating the operation screen of the touch panel display 1001 at that time. By ending the transmission of the image data, the non-input period continues, and the non-input period reaches the timeout time Ct, the operation system control unit 1600 switches the operation input to the MFP panel application 1400 from the remote panel to the touch panel display 1001.

(7-2) Processing Procedure of Progress Confirmation Application 1700

Figure 11:
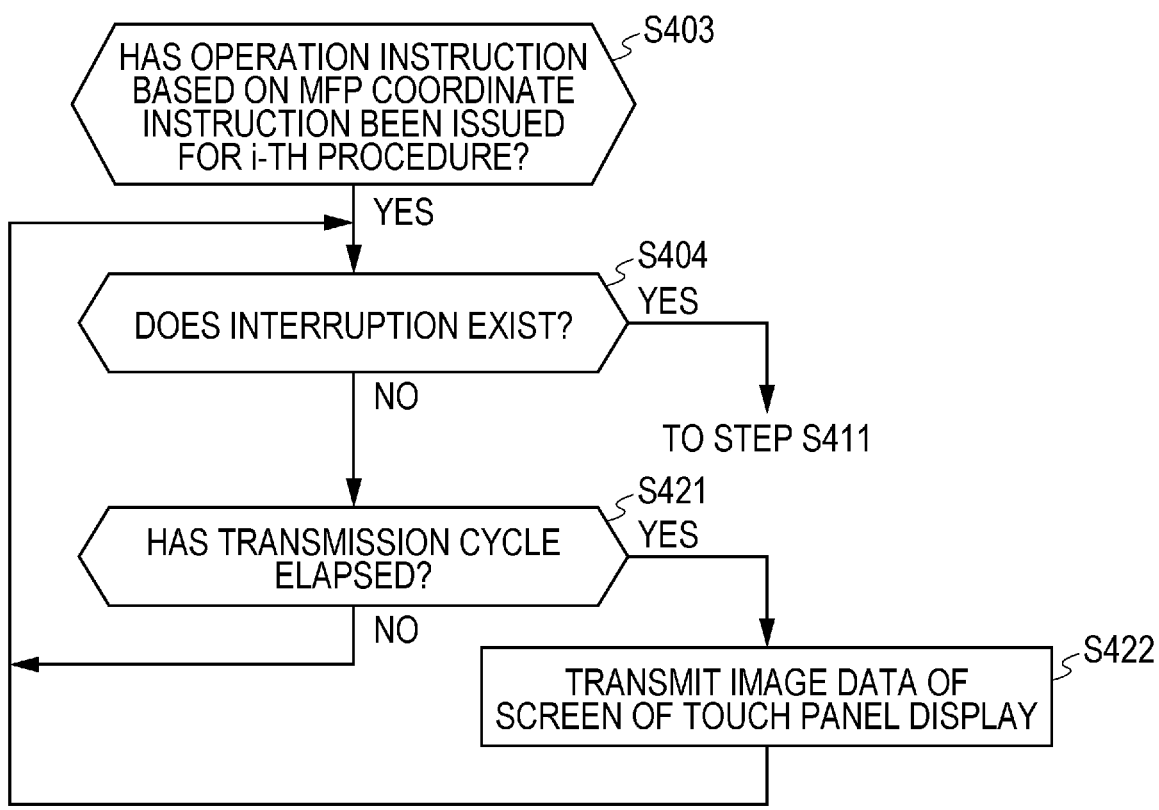
FIG. 11 is a flowchart illustrating a processing procedure of the progress confirmation application according to the second embodiment.

FIG. 11 is a flowchart illustrating a processing procedure of the progress confirmation application 1700 according to the second embodiment. This flowchart is based on the flowchart of FIG. 8, and the change is that step S405 is replaced with step S421 in the loop including steps S404 to S405 of FIG. 8, and step S422 is added as a process when step S421 is Yes.

Step S421 is a determination as to whether the transmission cycle Q illustrated in FIG. 10A has elapsed, and when the transmission cycle Q has elapsed (Yes in step S421), image data indicating the screen contents of the touch panel display 1001 is transmitted to the remote panel application 2400 (step S422). As the progress confirmation application 1700 repeats such transmission, the image data is transmitted to the remote panel application 2400 in a cycle shorter than the non-input period.

The remote panel application 2400 of the terminal device 2000 receives the image data transmitted from the progress confirmation application 1700 and displays the image data on the LCD 2001.

Hereinafter, the RPA script data 2600 and the RPA tool 2500 in the terminal device 2000 will be described.

(7-3) RPA Script Data in Second Embodiment

In the RPA script data 2600 of the first embodiment, a waiting time is clearly indicated in units of seconds, and issuance of an operation instruction is delayed by the wait designation to wait for the process of the image processing apparatus 1000 by the waiting time. On the other hand, in the second embodiment, the loop is continued without a time limit unless a certain condition is satisfied.

The RPA tool 2500 determines whether a certain condition for getting out of the loop of the RPA script data 2600 is satisfied every time the image data indicating the operation screen of the MFP 1000 is transmitted. The certain condition for getting out of the loop is that the image data transmitted in each transmission cycle is greatly changed from the immediately preceding image data, and it is determined that the operation screen of the image processing apparatus 1000 has transitioned.

Specifically, every time new image data is received, the RPA tool 2500 compares the received image data with the previously received image data to count how many different pixels are present. Then, a ratio of the different pixels to the area of the entire screen is calculated. It is determined whether or not the ratio thus calculated exceeds a threshold value.

When an animation indicating waiting for a process is displayed as in the pieces of image data 1061 to 1064 of FIG. 10B, there are pixels having different contents in each piece of image data to be transmitted. However, in the animation of FIG. 10B, the difference between the individual screens is a difference in color of some circles, and the ratio of the pixels whose contents have changed to the entire screen is less than the threshold value.

On the other hand, when the content of the image data is switched from pieces of image data 1961 to 1064 indicating the animation as illustrated in FIG. 10B to the image data 1065 indicating the operation screen, the ratio of pixels whose content has changed to the entire screen is equal to or more than the threshold value.

The switching of the operation screen in the MFP 1000 is determined by such calculation of the ratio and comparison with the threshold value.

As described above, according to the present embodiment, the next operation is executed without waiting for the elapse of the waiting time explicitly indicated by the wait designation depending on whether the content of the image data has greatly changed from the immediately preceding image data, and thus, it is possible to cause the MFP 1000 to execute each procedure defined in the RPA script data at an appropriate timing.

[8] Third Embodiment

Figure 15:
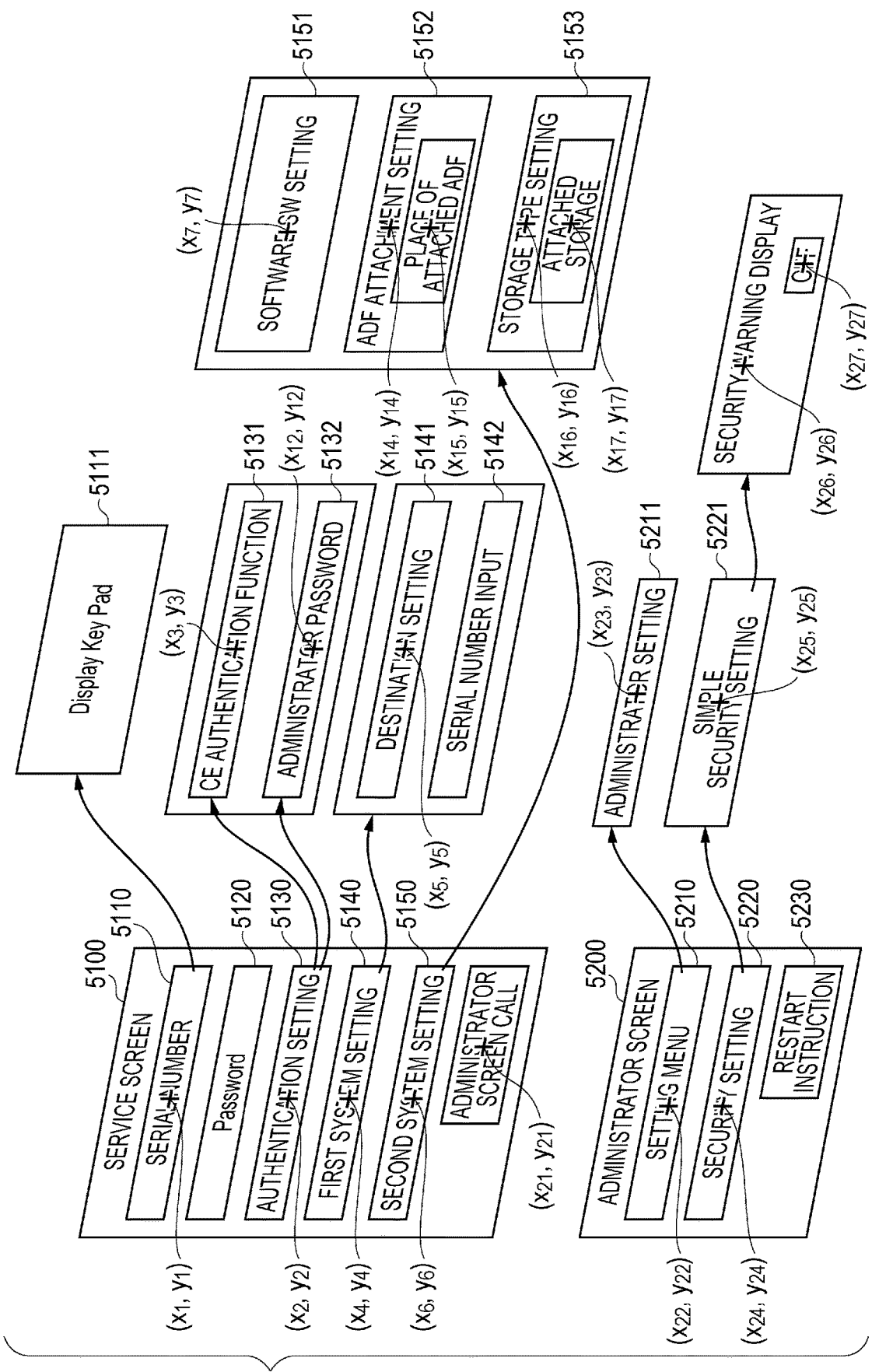
FIG. 15 illustrates a screen used for the initial setting at a time of introduction of the MFP.

In the present embodiment, the initial setting when the MFP 1000 is introduced to an office is automated by RPA. FIGS. 12 to 14 illustrate examples of RPA script data for performing initial setting. These scripts are assumed to operate a setting screen as illustrated in FIG. 15. FIG. 15 illustrates a screen used for setting at the time of introduction of the MFP 1000. Such screens include a service screen 5100 and an administrator screen 5200. These include various setting items, and the service person needs to sequentially set them at the time of introduction of the MFP 1000.

(8-1) Screen Targeted for Apparatus Setting

The service screen 5100 in FIG. 15 includes a serial number 5110, a password 5120, an authentication setting 5130, a first system setting 5140, and a second system setting 5150, in which when the serial number 5110 is clicked, a display keypad 5111 can be called up, and when the authentication setting 5130 is clicked, a CE authentication function 5131 and an administrator password 5132 can be called up.

The first system setting 5140 can call up a menu including a destination setting 5141 and a serial number input 5142. The second system setting 5150 can call up a menu including the software switch setting 5151, an ADF attachment setting 5152, and a storage type setting 5153.

The administrator screen 5200 includes a setting menu 5210 and a security setting 5220, the setting menu 5210 can call up an administrator setting 5211, and the security setting 5220 can call up a simple security setting 5221.

(8-2) RPA Script Data for Apparatus Setting

FIG. 12 illustrates a script column that achieves a series of procedures from the ROM version check to the CE authentication function 5131, the destination setting, and the software SW setting in the initial setting of the device.

Procedure 1 includes a script for checking and displaying the version of firmware installed in the ROM 1008 of the MFP 1000.

Procedure 2 includes a script of contents of downloading firmware of a version suitable for the MFP 1000 from a URL of contents of accessing an official site of the manufacturer of the MFP 1000 and writing the firmware in a memory card connected to the terminal device 2000. Since the firmware is written into the memory card by the script of the procedure, the operator connects the memory card in which the new version firmware is written to the MFP 1000 and causes the MFP 1000 to upgrade the memory card. When the version upgrade from the memory card is completed, the screen presented in this procedure is operated to end the process. Since it takes time to download the firmware and copy the firmware, a script of wait designation to wait for the process on the MFP 1000 side is inserted before issuance of Procedure 3.

Procedure 3 includes a procedure for generating a click event at the coordinates (x1, y1) of serial number 5110 from the service screen, and Procedure 4 includes a script for generating an event for inputting characters.

Procedure 5 emits a click event from the service screen 5100 at the coordinates (x2, y2) of the authentication setting 5130.

In Procedure 6, a click event occurs at the coordinates (x3, y3) of the location of the CE authentication function 5131 from the service screen 5100, and in Procedure 7, a click event occurs at the coordinates (x4, y4) of the location of the first system setting 5140 from the service screen 5100.

Procedure 8 includes a script for generating a click event at coordinates (x5, y5) of the location of the destination setting 5141 from the first system setting 5140, and Procedure 9 includes a script for generating an event for inputting characters of the destination.

Procedure 10 includes a script for generating a click event at coordinates (x6, y6) of the location of the second system setting 5150 from the service screen 5100, and Procedure 11 includes a script for generating a click event at coordinates (x7, y7) of the software switch setting 5151 and inputting characters of setting values of the software SW with characters.

In the above process, backup of the firmware to be stored in the ROM 1008 requires specialized determination by the user, requires determination and manual operation by the user, and takes time. Since the transmission of the progress report request message and the transmission of the progress report illustrated in FIG. 4B are repeatedly performed between the RPA tool 2500 and the MFP panel application 1400, even when the user takes time to input the serial number, the operation input to the MFP panel application 1400 is not switched to the touch panel display 1001, and the state of receiving the operation input from the remote panel application 2400 is maintained.

FIG. 13 illustrates a series of procedures of receiving the administrator password 5132, the ADF attachment setting 5152, and the storage type setting 5153 from the serial number input. Procedure 12 includes a script for presenting the serial number input 5142 and prompts the input. The script of Procedure 12 calls the following functions of PYAutoGUI.

Prompt(text="character string", title="character string", default="")

This function pops up a menu with the argument title as a title name, displays a character string designated by the argument text, receives text input, and receives input of an OK button and a Cancel button. The input of the serial number is described using this Prompt.

Since it takes time to input the serial number input screen, wait designation indicating to wait for the process on the MFP 1000 side is inserted before issuance of Procedure 13.

Procedure 13 includes a script of contents for generating a click event at the coordinates (x2, y2) of the location of the service screen 5100.

Procedure 14 generates a script for generating a click event at coordinates (x12, y12) of administrator password 5132, and an event for inputting characters of a password common between the devices by characters. Procedure 15 includes a script for generating a click event at the coordinates (x6, y6) of the location of the second system setting 5150.

Procedure 16 includes a script for generating a click event at coordinates (x14, y14) of the location of the ADF attachment setting 5152.

Procedure 17 includes a script for generating a click event at coordinates (x15, y15) of the location of the attached ADF.

Procedure 18 includes a script for generating a click event at coordinates (x16, y16) of the storage type setting 5153. Procedure 19 includes a script for generating a click event at coordinates (x17, y17) of the location of "attached storage".

Among the information input in the above procedure, the serial number is unique to the apparatus, and a serial number described in a manual, a package, or the like must be separately prepared and input by the user using the keyboard 2003. Accordingly, in the script column of FIG. 13, a serial number input screen is presented in Procedure 12 to prompt the user to input a serial number, and then wait designation is executed. In this manner, since the transmission of the progress report request message and the transmission of the progress report illustrated in FIG. 4B are repeatedly performed between the RPA tool 2500 and the MFP panel application 1400, even when the user takes time to input the serial number, the operation input to the MFP panel application 1400 is not switched to the touch panel display 1001, and the state of receiving the operation input from the remote panel application 2400 is maintained.

FIG. 14 illustrates a series of procedures of performing administrator setting and security setting from a restart instruction. In Procedure 20, a restart instruction screen is presented to prompt input.

The script of Procedure 20 is configured by calling an Alert function.

In Procedure 21, a click event is generated at coordinates (x21, y21) of the call button on the administrator screen 5200, in step 22, a click event is generated at coordinates (x22, y22) of the setting menu 5210, and in step 23, a click event is generated at coordinates (x23, y23) of the administrator setting 5211. In Procedure 24, a click event is caused at coordinates (x24, y24) of the security setting 5220, and in Procedure 25, a click event is caused at coordinates (x25, y25) of the simple security setting 5221. In Procedure 26, a click event is generated at coordinates (x26, y26) of security warning display. Procedure 27 generates a click event at coordinates (x27, y27) of "OFF".

In the above procedure, it is necessary for the user to manually restart the MFP 1000. Therefore, in the script column of FIG. 14, a restart instruction 5230 is presented in Procedure 20, a restart operation is presented to the user, and then wait designation is executed. In this manner, since the transmission of the progress report request message and the transmission of the progress report illustrated in FIG. 4B are repeatedly performed between the RPA tool 2500 and the MFP panel application 1400, even when the user takes time to restart, the operation input to the MFP panel application 1400 is not switched to the touch panel display 1001, and the state of receiving the operation input from the remote panel application 2400 is maintained.

(8-3) Summary

As described above, according to the present embodiment, it is possible to automatically input, set, and change various setting values when introducing the image processing apparatus using the RPA script data.

[9] Fourth Embodiment

In the first embodiment, the progress report indicating whether or not the process commanded by the RPA tool 2500 has been completed is received from the MFP 1000, and it is determined whether or not to instruct the next procedure. On the other hand, in a fourth embodiment, the RPA tool 2500 performs transmission for maintaining the connection state between the terminal device 2000 and the MFP 1000.

(9-1) Connection State Between Terminal Device 2000 and MFP 1000

The connection state between the terminal device 2000 and the MFP 1000 is a state in which the TCP connection is established in the protocol stack illustrated in FIG. 3B.

In the physical layer, since the near field communication is performed, the time for which the TCP connection times out is set to be relatively short. Such a timeout of the TCP connection results in a timeout of the remote control mode, in the present embodiment, control for maintaining such a connection state is executed.

(9-2) Sequence According to Fourth Embodiment

Figure 16:
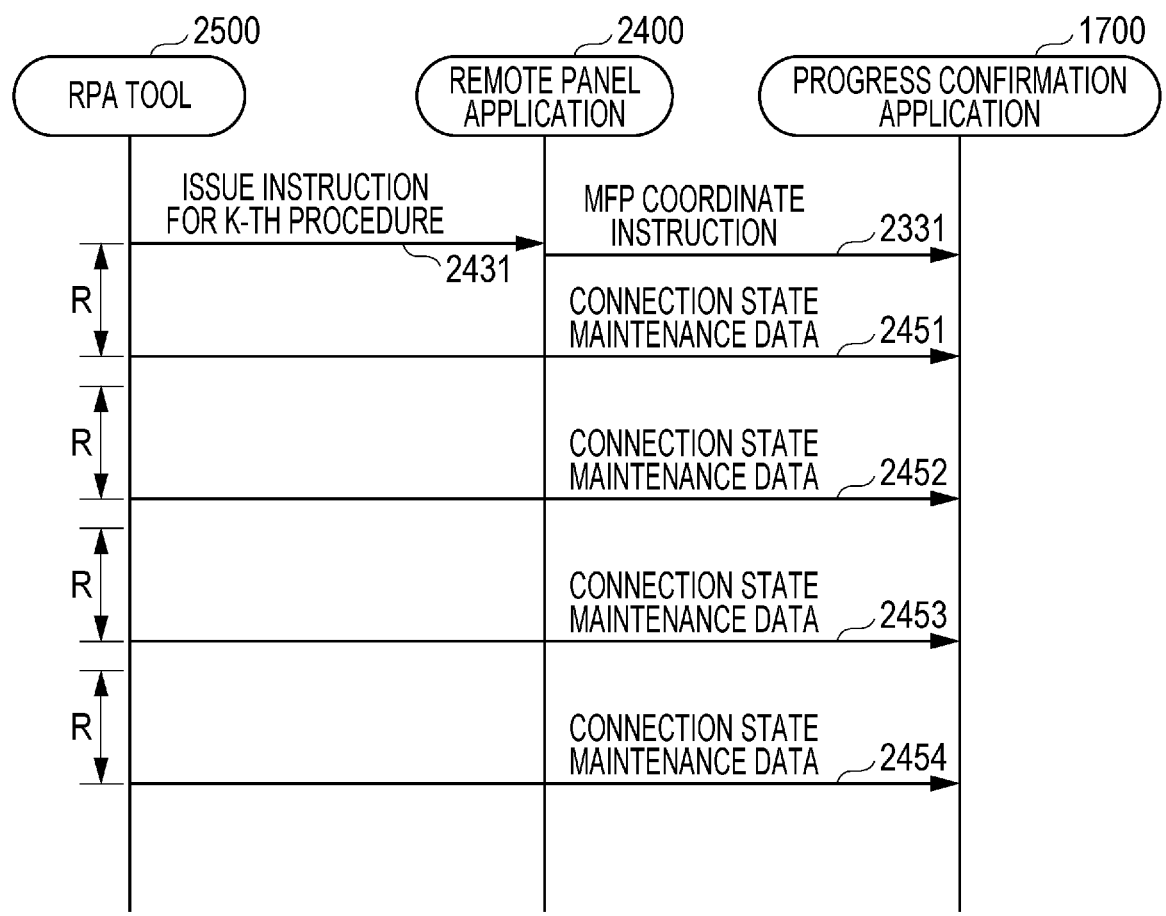
FIG. 16 is a sequence diagram according to a fourth embodiment.

FIG. 16 is a sequence diagram according to a fourth embodiment. This drawing is based on FIG. 4B. The difference from FIG. 4B is that the RPA tool 2500 transmits pieces of connection state maintenance data 2451, 2452, 2453, and 2454 every time the cycle R elapses, but the progress confirmation application 1700 does not transmit the progress report message and unidirectional transmission is performed. As described above, the ICMP command and the Ping command can be used as the information for maintaining the connection of the TCP connection.

Figure 17:
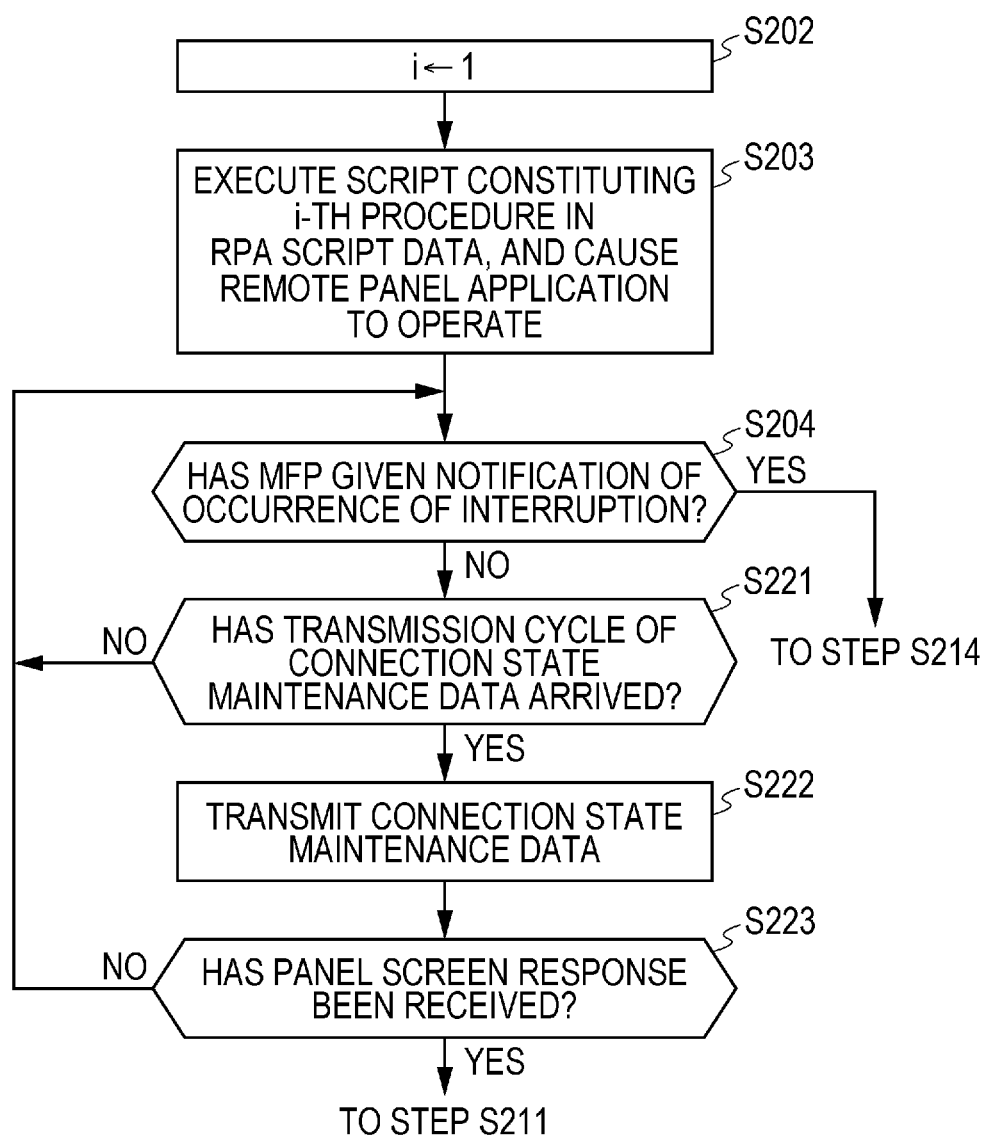
FIG. 17 is a flowchart illustrating a processing procedure of the RPA tool according to the fourth embodiment.

FIG. 17 is a flowchart illustrating a processing procedure of the RPA tool 2500 according to the fourth embodiment. This drawing is based on FIG. 7 and illustrates only the differences. The difference from FIG. 7 is that step S205 is replaced with step S221, and steps S222 and S223 are added instead of steps S206 and S207 as steps executed when step S221 is Yes.

Step S221 is a determination as to whether the transmission cycle of the connection state maintenance data for maintaining the TCP connection has arrived, and when the transmission cycle has not arrived yet (No in step S221), the loop of steps S204 and S221 is repeated. When the transmission cycle has arrived (Yes in step S221), connection state maintenance data is transmitted (step S222), and thereafter, in step S223, it is determined whether the remote panel application 2400 has received a panel screen response message. When it has not been received (No in step S223), the process proceeds to step S204. When the panel screen response message has already been received (Yes in step S223), the process proceeds to step S209.

(9-3) Summary

As described above, according to the present embodiment, since the TCP connection is maintained between the remote panel application 2400 and the RPA tool 2500, the operation input to the MFP panel application 1400 is not switched to the touch panel display 1001, and the state of receiving the operation input from the remote panel application 2400 is maintained.

[10] Fifth Embodiment

In the first embodiment, the state information indicating whether or not the process commanded by the RPA tool 2500 is completed is received from the MFP 1000, and it is determined whether to instruct the next procedure. On the other hand, in the present embodiment, the progress report message from the MFP 1000 indicates how much the process of the MFP 1000 has progressed.

(10-1) Flowchart of Progress Confirmation Application

Figure 18:
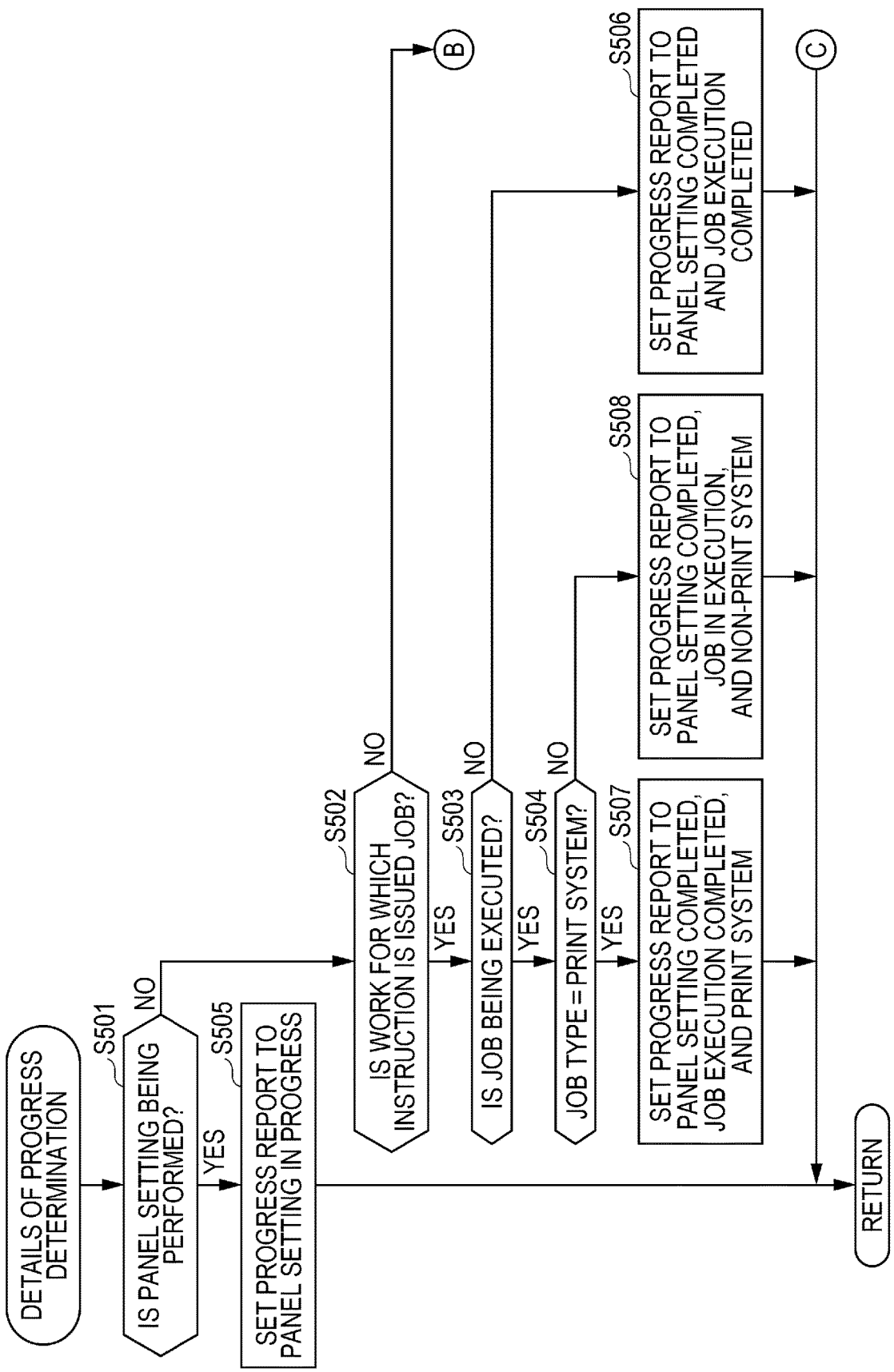
FIG. 18 is a flowchart illustrating details of a progress determination.
Figure 19:
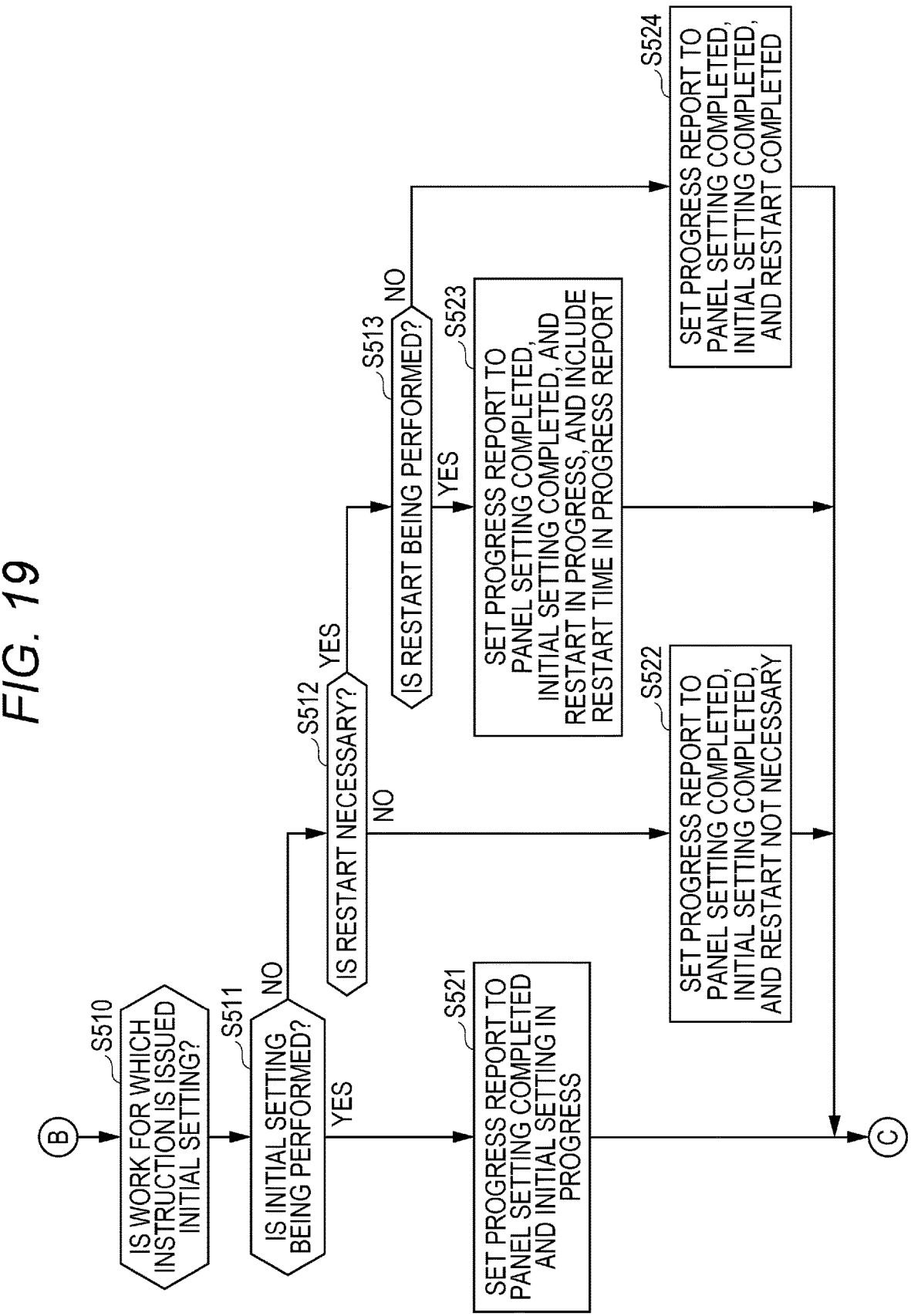
FIG. 19 is a flowchart illustrating a progress report request message transmission procedure according to the fourth embodiment.

In the present embodiment, the progress confirmation application 1300 confirms the progress according to the flowcharts of FIGS. 18 and 19.

FIG. 18 is a flowchart illustrating details of the progress determination. Step S501 is a determination as to whether the panel setting is being performed, and step S502 is a determination as to whether the work on which an instruction is issued is a job.

When the panel setting is being performed (Yes in step S501), the progress report is set to panel setting in progress in step S505. When the panel setting is not being performed (No in step S501) and the panel setting is completed, it is determined in step S502 whether the work on which the instruction is issued is a job or initial setting. When it is a job (Yes in step S502), steps S503 and S504 are executed.

Step S503 is a determination as to whether the job is being executed, and step S504 is a determination as to whether the job type is a print system.

There are two types of job types: one that mainly prints image data (print system), and one that does not print image data and mainly generates and transmits image data (non-print system).

When the progress report message indicates the non-print system while the job is being executed, step S503 is Yes, step S504 is No, and the progress report message is set to panel setting completed, job in execution, and non-print system (step S508). When the progress report indicates the print system while the job is being executed, step S503 is Yes, step S504 is Yes, and the progress report message is set to panel setting completed, job in execution, and print system (step S507). When the job is not being executed (No in step S503), the progress report message is set to panel setting completed, and job execution completed (step S506).

FIG. 19 illustrates a processing procedure of the progress report when No is determined in step S502 and initial setting is performed.

Step S510 is a determination as to whether the instructed work is the initial setting, step S511 is a determination as to whether the initial setting is being performed, step S512 is a determination as to whether the restart is necessary, and step S513 is a determination as to whether the restart is being performed.

When the initial setting is being performed, step S511 is Yes, and the progress report message is set to panel setting completed and initial setting in progress in step S521. When the initial setting has been completed but the restart is not necessary, then step S511 is No, step S512 is No, and in step S522, the progress report message is set to panel setting completed, initial setting completed, and restart not necessary. When the initial setting is completed and the restart is necessary but the restart is being performed (Yes in step S513), the progress report message is set to panel setting completed, initial setting completed, and restart in progress in step S523. In addition, a time necessary for restart is included in the progress report message. When the initial setting is completed, the restart is necessary, and the restart is completed (No in step S513), the progress report message is set to initial setting completed, restart necessary, and restart completed in step 524.

(10-2) Flowchart of RPA Tool 2500 According to Fifth Embodiment

Figure 20:
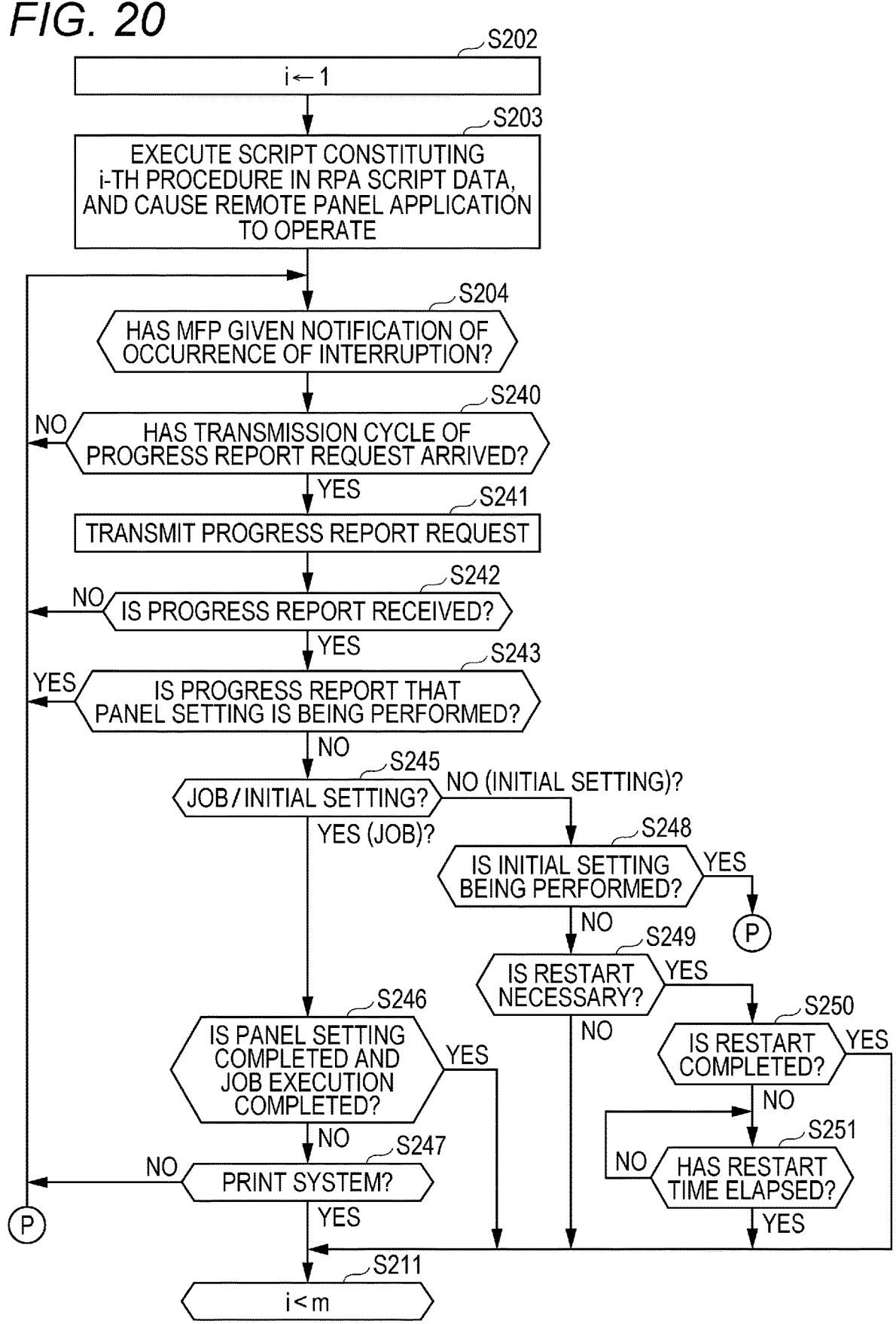
FIG. 20 is a flowchart illustrating a progress report request message transmission procedure according to the fourth embodiment.

FIG. 20 illustrates a processing procedure of the RPA tool 2500 according to the fifth embodiment. The flowchart of FIG. 20 is different from that of FIG. 7 in that steps S240 to S243 are provided instead of steps S205 to S201.

In the present embodiment, when the wait time is designated, the process proceeds to a loop of step S204, step 240, and step S242. Step S240 is a determination as to whether the transmission cycle of the progress report request message has arrived, step S241 is a determination as to whether the progress report request message has been transmitted, and step S242 is a determination as to whether the progress report message has been received. When the transmission cycle of the progress request does not arrive, the loop of steps S204 to S240 is repeated. When the transmission cycle arrives (Yes in step S240), a progress report request message is transmitted (step S241), and it is determined whether the progress report message has been received (step S242). When the progress report message is not received (No in step S242), the process returns to step S204. When it is received (Yes in step S242), the process proceeds to steps S243 to S245.

Step S243 is a determination as to whether the progress indicated in the progress report indicates that the panel setting is being performed, step S246 is a determination as to whether or not the panel setting completed is indicated, and step S247 is a determination as to whether or not it is the print system. When the progress report message indicates panel setting, panel setting completed, and job completed, then step S243 is No, step S245 is job, step S246 is Yes, and the process proceeds to step S211.

When the progress report message indicates panel setting, panel setting completed, job in progress, and print system, then step S243 is No, step S245 is job, step S246 is No, and step S247 is Yes, and the process proceeds to step S211. In this case, it is assumed that the next procedure can be instructed.

When the progress report message indicates panel setting completed, job in progress, and non-print system is in progress, then step S243 is No, step S245 is job, step S246 is No, step S247 is No, and the process proceeds to step S204.

Step S248 is a determination as to whether the initial setting is being performed. Step S249 is a determination as to whether the restart is necessary, and step S250 is a determination as to whether restart is completed. When the panel setting is completed but the initial setting is being performed, then step S245 is No (initial setting), step S248 is Yes, and the process proceeds to step S204.

When the panel setting is completed, the initial setting is completed, and the restart is unnecessary, then step S245 is No (initial setting), step S248 is No, step S249 is No, and the process proceeds to step S211.

When the panel setting is completed, the initial setting is completed, the restart is necessary, and the restart is not completed, step S245 is No (initial setting), step S248 is No, step S249 is Yes, and step S250 is No. In this case, the process waits for the elapse of the restart time indicated in the progress report (No in step S251), and when it elapses (Yes in step S251), the process proceeds to step S211. When the panel setting is completed, the initial setting is completed, the restart is necessary, and the restart is completed, step S245 is No (initial setting), step S248 is No, step S249 is Yes, and step S250 is Yes. In this case, the process proceeds to step S211.

(10-3) Summary

As described above, according to the present embodiment, the progress report indicates the progress status of work in the MFP 1000, such as whether the panel setting has been completed, whether a print job is being executed, whether initial setting has been completed, and whether restart is being executed in the MFP 1000, and thus issuing intervals of individual work instructions in the RPA script data can be shortened.

[11] Modification

Although the present invention has been described on the basis of the embodiments, it is needless to say that the present invention is not limited to the above-described embodiments, and the following modification examples are conceivable.

Figure 21:
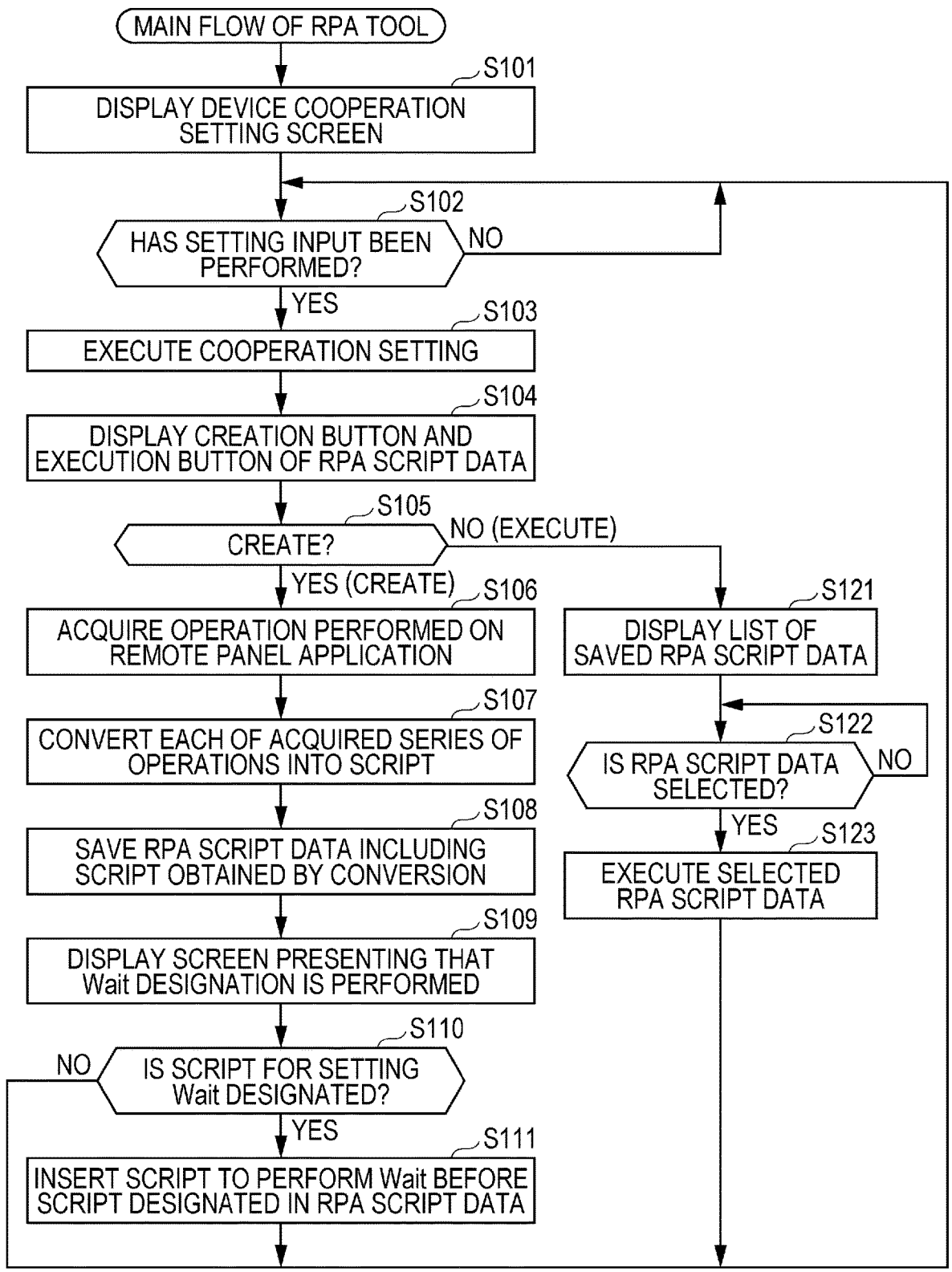
FIG. 21 is a flowchart illustrating a main routine of the RPA tool when cooperation setting is executed.

(1) It is desirable to execute cooperation setting prior to start of the RPA tool 2500. FIG. 21 illustrates a processing procedure of the RPA tool 2500 when the cooperation setting is executed. First, the device cooperation setting screen is displayed (step S101), and then, it is waited for setting input (step S102). FIG. 22 illustrates an example of the cooperation setting screen. The cooperation setting screen includes a check box 2101 indicating designation of whether to cooperate with the MFP 1000, an input field 2102 in which an IP address of the MFP 1000 can be input, a user name input field 2103, and a password input field 2104, when the save button 2015 is pressed on the screen configured to receive input of alphanumeric characters on the keyboard, the input user ID and password are saved, and password input can be omitted. When the setting input is performed (Yes in step S102), the cooperation setting is executed (step S103), and a creation button and an execution button of the RPA script data are displayed (step S104). Subsequently, selection as to whether to perform creation or execution of the touch panel display is received (step S105). When it is creation of the RPA script data, the operation performed on the remote panel 2001D is acquired (step S106), each of the acquired series of operations is converted into a script (step S107), and the RPA script data including the script obtained by the conversion is saved (step S108).

Thereafter, a screen presenting that wait designation is performed is displayed (step S109), and it is waited for a script for setting wait to be designated (step S110). When it is designated, wait designation is inserted before the script designated in the RPA script data (step S111). After the above process, the process returns to the loop of step S102. When the RPA script data is executed, a list of saved RPA script data is displayed (step S121), and it is determined whether the RPA script data is selected (step S122). When RPA script data is selected (Yes in step S122), the selected RPA script data is executed (step S123).

(2) In each embodiment, the remote control mode is maintained by the RPA tool 2500 and the progress confirmation application 1700 communicating at a transmission cycle shorter than a certain period of time until the remote control mode times out, but it is not limited thereto. The remote control mode may be maintained by causing the input system control unit 1600 to perform control specific to the remote control mode. Specifically, even if there is no communication with the terminal device 2000 while the job execution application 1500 executes the job according to the control instruction made from the terminal device side in the remote control mode, the input system is not switched from the remote panel to the local panel, and the remote control mode is maintained. In this manner, the amount of data communication between the MFP 1000 and the terminal device 2000 can be reduced.

(3) A script file including the RPA script column created by the RPA tool 2500 in the RPA creation mode is written and stored in the HDD 2005 of the terminal device 2000, but it is not limited thereto. The script file including the RPA script column created by the RPA tool 2500 in the RPA creation mode may be written in a built-in storage of the MFP 1000. In the RPA execution mode, among files stored in the HDD 1005, which is a built-in storage of the MFP 1000, files to which an extension specific to the script file is attached are read and subjected to list display on the LCD 2001 of the terminal device 2000. Then, one selected by the user from the list of the RPA script column may be executed.

The script file including the RPA script column created by the RPA tool 2500 in the RPA creation mode may be written and stored in the storage of the server device in the external network.

(4) As the script, Python (registered trademark), VBScript (registered trademark), VB.NET (registered trademark), GAS (registered trademark), and C#(registered trademark) can be used.

VBScript (registered trademark) is a language also used in WinActor. VB. NET (registered trademark) is a Visual Basic language used in UiPath, and is suitable for operating Office products.

GAS (registered trademark) is a programming language developed on the basis of JavaScript and enables cooperation and operation of services such as Google (registered trademark) maps, emails, and spreadsheets.

C#(registered trademark) is a programming language developed by Microsoft Corporation, and can use an API for operating Windows. It is not limited thereto, and other programming languages may be used as long as the programming languages can be executed without compiling and linking.

(5) The paper type loaded in the sheet feeding cassette may be automatically set by describing paper setting according to a detection result by a medium sensor in RPA script data and causing the RPA tool 2500 to execute the setting. The medium sensor measures the reflectance of green (G) light, the transmittance of near-infrared light (Ir), the transmittance of blue light (B), and the transmittance of ultrasonic waves by an optical sensor, an infrared sensor, and an ultrasonic sensor, and determines whether the type of sheet used for printing is recycled paper, coated paper, or an envelope from these reflectances and transmittances. At the time of detection by the medium sensor, a character string indicating the sheet type thus detected is displayed on the screen, and thus the detected character string is set to the sheet type of the corresponding sheet feeding cassette. In this manner, the detection result by the medium sensor can be reflected on the sheet type of the sheet feeding cassette without manual intervention. This detection by the medium sensor may take time, and thus the wait designation is added before the script for drawing the detection result. In this manner, even if it takes time to detect the medium sensor, the operation input to the MFP panel application 1400 is not switched to the touch panel display 1001, and the state of receiving the operation input from the remote panel application 2400 is maintained.

(6) The screen number may be used to clearly indicate the progress report in the MFP 1000. The screen number is a number for instructing each of hierarchical screens displayed on the touch panel display 1001, and a script indicating an individual procedure of the RPA script data indicates its own target screen number. When transmitting the progress report, the progress confirmation application 1700 acquires the screen number of the screen currently displayed on the touch panel display 1001, and returns the progress report including the screen number to the RPA tool 2500. In this manner, by returning the current screen number, it is possible to confirm whether or not it is a state where the script constituting the RPA script data is allowed to be executed, and the RPA tool 2500 can instruct the MFP 1000 to execute the next procedure after waiting for the screen in the MFP 1000 to reliably transition.

(7) It is desirable to execute a determination as to whether the wait time in the RPA script data is shorter than the timeout value of the non-input period. Then, when the designated wait time is longer than the timeout value of the non-input period, as described in the first embodiment, the MFP 1000 is instructed to perform the process, and then the progress report request message is transmitted every period described above. When the designated wait time is shorter than the timeout value of the non-input period, the transmission of the progress report request message in each cycle is performed after waiting for the wait period to elapse after the MFP 1000 is instructed to perform the process.

(8) In the terminal device 2000, a mouse and a keyboard are used as the pointing device that receives the user's operation, but the pointing device is not limited thereto. A keypad or a stylus may be used.

(9) Note that the example of the MFP that is an image forming apparatus has been described as the image processing apparatus, but it is not limited thereto. A single-function scanner or a facsimile machine may be used. The printing device may be provided in a production printing apparatus, or may be provided in a label printer, a postcard printer, or a ticket issuing machine. Alternatively, it may be provided in a single-function copier or a single-function peripheral device (printer) of a personal computer.

An embodiment of the present invention can automate apparatus settings when an image processing apparatus is introduced into an office or panel settings when a job is executed in the image processing apparatus by using RPA, the embodiment of the present invention is likely to be used in industrial fields of various industry types such as a retail industry, a rental industry, a real estate industry, an advertisement industry, a transportation industry, and a publishing industry in addition to industrial fields of OA equipment and information equipment.

According to an embodiment of the present invention, in the second step, since communication with the image processing apparatus is repeated in a cycle shorter than a certain period of time until the remote control mode is canceled after a control instruction is issued to the image processing apparatus, the remote control mode is not canceled even if it takes time to execute a process for which the control instruction is issued. The process intended by the RPA can be executed without interruption.

Although embodiments of the present invention have been described and illustrated in detail, the disclosed embodiments are made for purposes of illustration and example only and not limitation. The scope of the present invention should be interpreted by terms of the appended claims.

What is claimed is:

1. A control method for an image processing apparatus having a remote control mode in which a control instruction is received from a terminal device, the method comprising:
    causing the image processing apparatus to transition to the remote control mode;
    receiving, by the terminal device, an operation by Robotic Process Automation (RPA) and giving a control instruction to the image processing apparatus, wherein the image processing apparatus cancels the remote control mode when a period during which there is no communication with the terminal device reaches a certain period of time,
    in the receiving, the terminal device repeats communication with the image processing apparatus at a cycle shorter than the certain period of time after giving the control instruction to the image processing apparatus,
    in the repeat of the communication, transmission of image data indicating content of an operation screen of the image processing apparatus is repeated, and
    the terminal device determines whether the process for which the control instruction is given is completed based on whether or not the content of the operation screen indicated in the image data transmitted from the image processing apparatus is same as content of an operation screen indicated in image data transmitted immediately before.

2. The control method according to claim 1, wherein the repeat of the communication is performed by the terminal device repeatedly requesting, at a cycle shorter than the certain period of time, the image processing apparatus for a progress report of a process corresponding to the control instruction, and the image processing apparatus returning a report for the request to the terminal device.

3. The control method according to claim 2, wherein the progress report indicates whether the process is incomplete or completed, and
    in the receiving, when the report indicates process incompletion, a subsequent operation is not performed, and when the report indicates process completion, the subsequent operation is performed.

4. The control method according to claim 2, wherein the progress of the process indicated by the report is whether panel setting of the image processing apparatus is completed or not completed.

5. The control method according to claim 4, wherein when the progress of the process indicated by the progress report indicates completion of the panel setting of the image processing apparatus, the report indicates whether restart for reflecting the panel setting in the image processing apparatus is being executed, and whether the restart has been completed.

6. The control method according to claim 5, wherein when the report of the progress indicates that the restart is being performed, the report indicates a remaining time of the restart.

7. The control method according to claim 2, wherein the progress of the process indicated by the report of the progress is whether a job instructed to the image processing apparatus has been completed or not.

8. The control method according to claim 7, wherein the progress of the process indicated by the progress report indicates whether a job for which the control instruction is given is completed or not, and the type of the job includes print output or not, and
when the job for which the control instruction has been given is not completed, but a type of the job being executed involves print output, the receiving executes a subsequent operation by the RPA.

9. The control method according to claim 1, wherein the timeout of the remote control mode is disconnection of a connection established between the terminal device and the image processing apparatus, and
maintenance control transmits information for maintaining the connection from one of the terminal device and the image processing apparatus to the other within the certain period of time.

10. The control method according to claim 1, wherein the causing further gives a notification that the remote control mode is a remote control mode performed by automatic operation by the RPA, and
the method further comprises
second causing an operation panel of the image processing apparatus to display that a remote control mode by the RPA is performed when the image processing apparatus receives the notification.

11. The control method according to claim 10, wherein when a process corresponding to a first control instruction by the RPA is completed, the second causing further causes the operation panel to display the completion.

12. A control method for an image processing apparatus having a remote control mode in which a control instruction is received from a terminal device, the method comprising:
receiving a request from the terminal device and transitioning to the remote control mode; and
canceling the remote control mode when a period during which there is no communication with the terminal device reaches a certain period of time, wherein
in the canceling,
while a job according to an instruction from the terminal device is being executed, the remote control mode is maintained without being canceled even when the certain period of time elapses.

13. A terminal device that issues a control instruction to an image processing apparatus having a remote control mode, the terminal device comprising:
a hardware processor that
causes the image processing apparatus to transition to the remote control mode, and
receives an operation by Robotic Process Automation (RPA) and gives a control instruction to the image processing apparatus, wherein
in a case where the remote control mode is canceled when a period during which there is no communication with the image processing apparatus reaches a certain period of time, the hardware processor gives a control instruction to the image processing apparatus, and thereafter repeats communication with the image processing apparatus at a cycle shorter than the certain period of time,
in the repeat of the communication, transmission of image data indicating content of an operation screen of the image processing apparatus is repeated, and
the terminal device determines whether the process for which the control instruction is given is completed based on whether or not the content of the operation screen indicated in the image data transmitted from the image processing apparatus is same as content of an operation screen indicated in image data transmitted immediately before.

14. An image processing apparatus having a remote control mode in which a control instruction is received from a terminal device, the image processing apparatus comprising:
a hardware processor that
receives a request from the terminal device and transitions to the remote control mode, and
cancels the remote control mode when a period during which there is no communication with the terminal device reaches a certain period of time, and
while a job according to an instruction from the terminal device is being executed, the hardware processor maintains the remote control mode without canceling the remote control mode even when the certain period of time elapses.

15. A non-transitory recording medium storing a computer readable program for causing a computer to execute a process that issues a control instruction to an image processing apparatus having a remote control mode, the program causing the computer to perform:
causing the image processing apparatus to transition to the remote control mode; and
receiving an operation by Robotic Process Automation (RPA) and give a control instruction to the image processing apparatus, wherein
in a case where a period during which there is no communication with the computer reaches a certain period of time, and the image processing apparatus cancels the remote control mode, in the receiving, the control instruction is given to the image processing apparatus, and thereafter the computer is caused to repeat communication with the image processing apparatus at a cycle shorter than the certain period of time,
in the repeat of the communication, transmission of image data indicating content of an operation screen of the image processing apparatus is repeated, and
the computer determines whether the process for which the control instruction is given is completed based on whether or not the content of the operation screen indicated in the image data transmitted from the image processing apparatus is same as content of an operation screen indicated in image data transmitted immediately before.

16. A non-transitory recording medium storing a computer readable program for commanding a process to a computer having a remote control mode in which a control instruction is received from a terminal device to perform a process comprising:
receiving a request from the terminal device and transitioning to the remote control mode; and canceling the remote control mode when a period during which there is no communication with the terminal device reaches a certain period of time, wherein in the canceling, while a job according to an instruction from the terminal device is being executed, the remote control mode is maintained by the computer without being canceled even when the certain period of time elapses.

\* \* \* \* \*